United States Patent

Abe et al.

[11] Patent Number: 5,834,857
[45] Date of Patent: Nov. 10, 1998

[54] POWER SUPPLY DEVICE FOR COMMUNICATION APPARATUS

[75] Inventors: Koichi Abe, Yokohama; Yuji Kurosawa, Tokyo, both of Japan

[73] Assignee: Canon Kabushiki Kaisha, Tokyo, Japan

[21] Appl. No.: 421,927

[22] Filed: Apr. 14, 1995

[30] Foreign Application Priority Data

| Apr. 15, 1994 | [JP] | Japan | 6-101872 |
| Apr. 15, 1994 | [JP] | Japan | 6-101873 |
| Apr. 15, 1994 | [JP] | Japan | 6-101874 |
| Apr. 21, 1994 | [JP] | Japan | 6-083013 |
| May 9, 1994 | [JP] | Japan | 6-119513 |

[51] Int. Cl.[6] .................................................. H02J 7/02
[52] U.S. Cl. .......................... 307/66; 307/64; 307/65; 307/43; 358/400; 358/406; 323/275; 323/371; 455/343
[58] Field of Search ........................... 307/66, 64, 65, 307/68; 320/2; 323/275, 371; 358/400, 406, 335, 434; 455/343, 11.1; 364/492, 707

[56] References Cited

U.S. PATENT DOCUMENTS

| 4,249,245 | 2/1981 | Nakanishi et al. | 364/710 |
| 4,401,895 | 8/1983 | Petkovsek | 307/66 |
| 4,567,322 | 1/1986 | Tsuda | 179/2 A |
| 5,046,136 | 9/1991 | Tokunaga et al. | 455/343 |
| 5,157,271 | 10/1992 | Fujiwara | 307/66 |
| 5,384,624 | 1/1995 | Kajiwara | 355/207 |
| 5,414,306 | 5/1995 | Kanno et al. | 307/87 |
| 5,418,604 | 5/1995 | Nagakura et al. | 355/208 |

*Primary Examiner*—Fritz Fleming
*Assistant Examiner*—Albert W. Paladini
*Attorney, Agent, or Firm*—Fitzpatrick Cella Harper & Scinto

[57] ABSTRACT

This invention provides a facsimile apparatus which can reduce the consumption power of main power supply control means, and can suppress the charging frequency of a secondary battery without widening the operating voltage range of the main power supply control means.

The facsimile apparatus has a main power supply control unit. The main power supply control unit has a DC—DC converter which receives a power from a secondary battery, a solar battery, or a main power supply, and operates to maintain a constant output voltage, and a microcomputer driven by the output voltage from the DC—DC converter. The output voltage from the DC—DC converter is detected by a voltage detect circuit, and a voltage from the secondary battery is detected by another voltage detect circuit. The microcomputer performs control for supplying a power from the secondary battery or the solar battery to the DC—DC converter, control for charging the secondary battery by the main power supply or the solar battery, and the like.

84 Claims, 19 Drawing Sheets

POWER SUPPLY DEVICE FOR COMMUNICATION APPARATUS

BACKGROUND OF THE INVENTION

1. Field of the Invention

The present invention relates to a facsimile apparatus with an automatic receiving function.

2. Related Background Art

Conventionally, a facsimile apparatus which has a stand-by state (waiting state) and an operating state uses a switching power supply or the like as its power supply. The power supply is always enabled independently of the stand-by state and the operating state, and supplies a power.

Another apparatus which has a main power supply for the operating state and a sub power supply for the stand-by state is known. In this apparatus, only the sub power supply is enabled in the stand-by state, and the main power supply is enabled in the operating state, thus saving power consumption.

The present applicant proposed a new system which aims at low power consumption in the stand-by state with respect to the above-mentioned prior arts (U.S. patent application Ser. No. 231,848 filed on Apr. 25, 1994). In this new system, a main power supply (switching power supply) is ON/OFF-controlled by a controller which constitutes principal part of main power supply control means. The main power supply control means including the controller receives a power from a secondary battery in the stand-by state, and receives a power from the main power supply in the operating state. In this new system, in the stand-by state, the main power supply is suspended and only the main power supply control means is activated (stand-by). In the operating state, the main power supply control means supplies a control signal for turning on the main power supply to the main power supply, and in response to this control signal, the main power supply supplies a power. The new system can achieve lower power consumption than the above-mentioned prior arts.

However, in the above-mentioned new system, since a power is supplied from the secondary battery to the main power supply control means in the stand-by state, at least two voltage detection means including first voltage detection means for resetting the controller to prevent its over-run state, second voltage detection means for detecting a charging start voltage of the secondary battery, and the like must be arranged, and the following problems are posed.

Since the power supply voltage supplied from the secondary battery varies depending on the charged state of the secondary battery, the system in which the secondary battery directly supplies a power to the main power supply control means must adopt a controller which can correspond to a wide operating voltage range.

When the controller which can correspond to a wide operating voltage range is used, the consumption power required by the main power control means varies depending on the supplied power supply voltage, and the consumption power increases very much when the voltage supplied from the secondary battery is high. Therefore, the secondary battery is discharged earlier.

If the minimum operating voltage of the controller which can correspond to a wide operating voltage range is represented by Vmin, the voltage to be detected by the first voltage detection means is at least Vmin, and the lower limit value of the voltage to be detected by the second voltage detection means is set to be a voltage higher than Vmin. Therefore, the capacity of the secondary battery cannot be sufficiently utilized, and the discharging cycle of the secondary battery is shortened. As a result, the secondary battery must be charged frequently.

When the new system described above uses a photo sensor comprising a light-emitting element as a sheet (document sheet) sensor, since a current of several mA is supplied to the photo sensor as an operating current, a power of at least several mA is always consumed in sheet detection in the stand-by state, resulting in early discharging of the secondary battery.

In order to suppress discharging of the secondary battery, a mechanical switch may be used as a sheet sensor in place of the photo sensor. However, when the mechanical switch is used as a sheet detect switch, the mechanical switch does not consume any power, but it requires a very large operating force although the photo sensor does not require any operating force in sheet detection, and has lower reliability of sheet detection than that of the photo sensor.

In addition, when the new system described above displays the current time in the stand-by state, the following problems are posed.

When the time is measured by internal clock timer means of the controller (sub CPU) constituting the main power supply control means, since the power supply voltage to be supplied to the clock timer means varies depending on the charged state of the secondary battery, the clock timer means cannot accurately measure the time, and the time cannot be accurately displayed on an external device.

In order to display an accurate time, a real time clock controlled by the controller (sub CPU) may be arranged. However, since the real time clock makes data exchange between a main CPU and the controller (sub CPU) and the system arrangement of the controller (sub CPU) complex, cost undesirably increases, and it is difficult to realize such an arrangement.

On the other hand, when the main CPU can access the real time clock, the time cannot be displayed in the stand-by state in which the operation of the main power supply stops and no power is supplied to the main CPU.

The application of the new system described above proposed a new main power supply device which incorporates a delay circuit. Since this main power supply device has the delay circuit, when power supply from a power supply source (commercial AC power supply) is started (when the power switch of the apparatus is turned on), the delay circuit automatically supplies a power to the secondary battery for a predetermined period of time, and the controller controls a switching operation during the predetermined period of time.

However, in the main power supply device for the new system in the above-mentioned prior art, when the power supply source begins to supply a power, the delay circuit automatically supplies a power to the secondary battery for the predetermined period of time. In this system, since the main power supply control means controls the main power supply by utilizing the power supplied to the secondary battery for the predetermined period of time, if the delay circuit comprises an accumulation element (a capacitor or the like), the following problems are posed when the power supplied from the power supply source is instantaneously shut off.

(1) When the power supplied from the power supply source is instantaneously shut off for a short period of time, if the power supply is recovered before the charge accumulated on the accumulation element (capacitor or the like) is completely discharged, the predetermined period of time cannot be assured, and the power supply to the secondary battery cannot be performed for the predetermined period of time.

(2) When problem (1) occurs, the system may operate erroneously. In addition, the main power supply often cannot be turned on.

In the above-mentioned conventional facsimile apparatus which has the stand-by state and the operating state, when the main power supply is turned on by a key operation, a sound source for informing the ON operation of the main power supply operates in response to the ON operation of the main power supply, and the ON operation of the main power supply is informed to a user by means of a key touch tone from the sound source. The sound source normally uses a loudspeaker driven by a current.

However, in the new system described above, since the loudspeaker for informing the ON operation of the main power supply requires a large consumption power, it cannot be driven by the secondary battery, and is driven by the main power supply after the main power supply is turned on. Therefore, the ON operation of the main power supply cannot be informed to a user by a tone generated by the loudspeaker simultaneously with the ON operation of the main power supply. As a result, the user feels poor response.

SUMMARY OF THE INVENTION

It is an object of the present invention to improve a power supply device for a communication apparatus.

It is another object of the present invention to provide a facsimile apparatus which can save the consumption power of main power supply control means and can suppress the charging frequency of a secondary battery without widening the operating voltage range of the main power supply control means.

It is still another object of the present invention to provide a facsimile apparatus which can save the consumption power by a sheet detection operation and can suppress the discharging of a secondary battery without impairing the reliability of sheet detection.

It is still another object of the present invention to provide a facsimile apparatus which can display the time very accurately in a stand-by state without increasing cost.

It is still another object of the present invention to provide a power supply device which can supply a power to a secondary battery for a predetermined period of time even when a power supplied from a power supply source is instantaneously shut off, and can prevent operation errors of an apparatus and turn-on failures of a main power supply upon occurrence of an instantaneous shut-off state, in consideration of the above-mentioned problems.

It is still another object of the present invention to provide a facsimile apparatus which can immediately inform the ON operation of a main power supply to a user.

DETAILED DESCRIPTION OF THE PREFERRED EMBODIMENTS (First Embodiment)

The preferred embodiment of the present invention will be described below with reference to the accompanying drawings.

Figure 1:
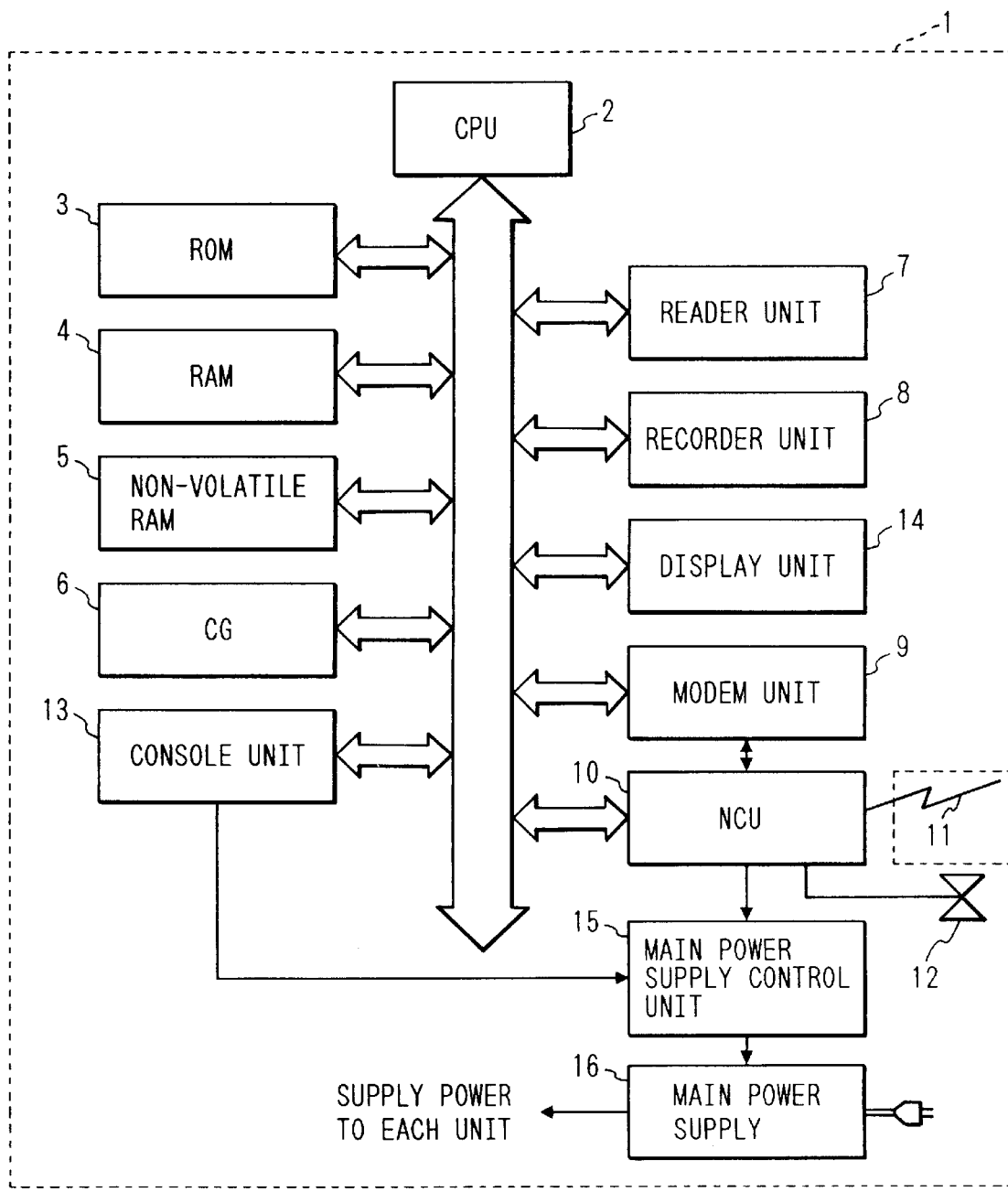
FIG. 1 is a block diagram showing the arrangement according to the first embodiment of the present invention.

FIG. 1 is a block diagram showing the arrangement of a facsimile apparatus according to the first embodiment of the present invention.

A facsimile apparatus 1 of this embodiment comprises a CPU 2 constituted by, e.g., a microprocessor, as shown in FIG. 1. The CPU 2 constitutes central control means. The CPU 2 controls a RAM 4, a non-volatile RAM 5, a character generator (to be abbreviated as a CG hereinafter) 6, a reader unit 7, a recorder unit 8, a modem unit 9, a network control unit (to be abbreviated as an NCU hereinafter) 10, a console unit 13, and a display unit 14 in accordance with a program stored in a ROM 3.

The RAM 4 stores binary image data read by the reader unit 7 or binary image data to be recorded by the recorder unit 8. Binary image data read by the reader unit 7 is modulated by the modem unit 9, and the modulated signal is output onto a telephone line 11 via the NCU 10. On the other hand, binary image data to be recorded by the recorder unit 8 is data obtained by demodulating an analog waveform signal input from the telephone line 11 via the NCU 10 and the modem unit 9.

The non-volatile RAM 5 comprises means for reliably storing data to be preserved (e.g., abbreviated dial numbers, and the like) when the power supply of the facsimile apparatus 1 is shut off.

The CG 6 comprises a ROM for storing characters such as JIS codes, ASCII codes, and the like. Character data corresponding to a predetermined code is read out from this ROM using 2-byte code data as needed under the control of the CPU 2.

The reader unit 7 comprises a DMA controller, an image processing IC, an image sensor, a CMOS logic IC, and the like. The reader unit 7 binarizes data read by utilizing a contact sensor (CS) under the control of the CPU 2, and sequentially supplies the binary data to the RAM 4. The sheet setting state on the reader unit 7 is detected by a mechanical sheet sensor (included in the console unit 13) arranged in the sheet convey path, and a sheet detection signal indicating the sheet setting state is input to a main power supply control unit 15. Since the sheet sensor uses the mechanical sheet sensor (mechanical switch) in place of a photo sensor, or the like, the consumption power in a stand-by state can be suppressed, and the power of a secondary battery (to be described later) can be prevented from being wasted.

The recorder unit 8 comprises a DMA controller, an ink-jet recording device, a CMOS logic IC, and the like. The recorder unit 8 reads out recording data stored in the RAM 4 under the control of the CPU 2, and records readout data as a hard copy.

The modem unit 9 comprises G3 and G2 modems, a clock generator connected to these modems, and the like. The modem unit 9 demodulates transmission data stored in the RAM 4 under the control of the CPU 2, and outputs the modulated data onto the telephone line 11 via the NCU 10. On the other hand, the modem unit 9 receives an analog signal from the telephone line 11 via the NCU 10, demodulates the received signal to obtain binary data, and stores the binary data in the RAM 4.

The NCU 10 selectively connects the telephone line 11 to one of the modem unit 9 and a telephone set 12 under the control of the CPU 2. The NCU 10 has means for detecting a calling signal (CI), and supplies an incoming call detection signal to the main power supply control unit 15 upon detection of the calling signal.

The telephone set 12 is integrated with the facsimile apparatus 1. More specifically, the telephone set 12 comprises a handset and a speech network, a dialer, a ten-key pad, one-touch keys, and the like.

The console unit 13 has a key for starting image transmission, reception, and the like, a mode selection key for designating an operation mode such as a fine mode, standard mode, automatic reception mode, and the like in a transmission/reception operation, a ten-key pad and one-touch keys used for dialing, a sheet detect switch (30 in FIG. 2, i.e., the above-mentioned sheet sensor), and the like. When one of these keys is depressed, or when the sheet detect switch detects a document sheet, an ON signal or a sheet detection signal is input to the main power supply control unit 15.

The display unit 14 comprises an LCD module as a combination of a pictograph LCD for displaying the current time as 7-segment characters and various modes, and a dot-matrix LCD which can display sixteen 5×7 dot digits×1 row, LEDs, and the like. The pictograph LCD and the dot-matrix LCD are independent from each other.

The main power supply control unit 15 comprises a circuit for controlling energization of (power supply to) the respective units of the entire facsimile apparatus 1. This circuit comprises a one-chip microcomputer, a capacitor type secondary battery, main power supply control means, and the like. The main power supply control unit 15 can be driven by a power supplied from the secondary battery. Upon reception of a sheet detection signal from the console unit 13, an incoming call detection signal from the NCU 10, or an ON signal from the console unit 13, the main power supply control unit 15 supplies an ON signal to a main power supply 16. The display state of the pictograph LCD in the display unit 14 is controlled by the microcomputer in the main power supply control unit 15, and the display state of the dot-matrix LCD in the display unit 14 is controlled by the CPU 2.

The main power supply 16 comprises a switching power supply which receives an AC power. The main power supply 16 comprises the switching power supply which can be externally ON/OFF-controlled. The switching power supply starts/stop power supply in response to a start/stop signal from the main power supply control unit 15.

Figure 2:
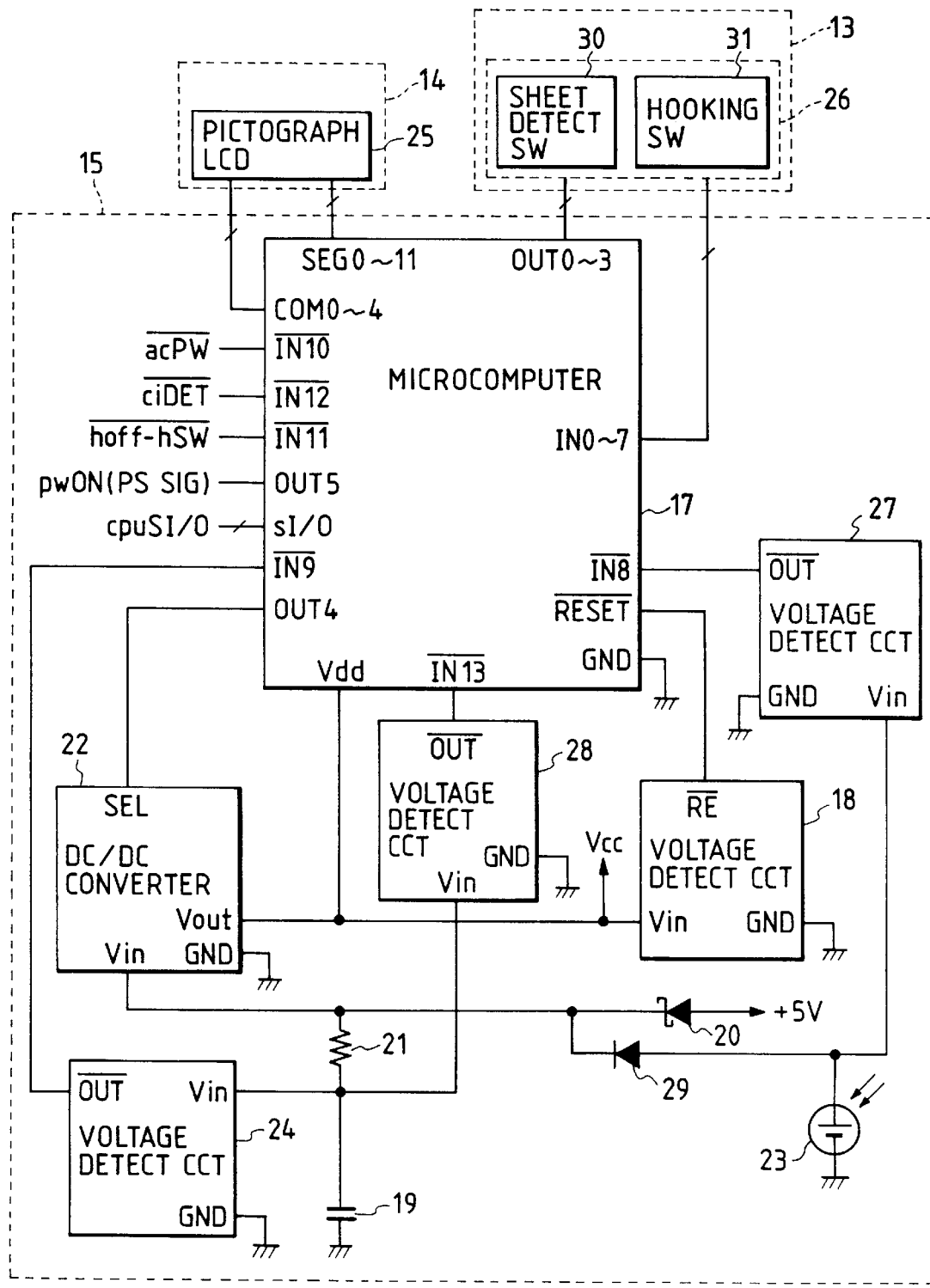
FIG. 2 is a schematic circuit diagram showing the arrangement of a main power supply control unit and its peripheral circuits in a facsimile apparatus shown in FIG. 1.

The schematic arrangement of the main power supply control unit 15 and its peripheral circuits will be described below with reference to FIG. 2. FIG. 2 is a schematic circuit diagram showing the arrangement of the main power supply control unit and its peripheral circuits used in the facsimile apparatus shown in FIG. 1.

A voltage Vcc is supplied from three different power supply sources via a DC—DC converter 22 (FIG. 2), as shown in FIG. 2. The first power supply source is the main power supply 16 which supplies a voltage of +5 V, the second power supply source is a solar battery 23, and the third power supply source is a capacitor type secondary battery 19. The priority of these three power supply sources is determined by their voltages, the charged state of the secondary battery 19, a reverse-flow prevention Schottky barrier diode 20, and a reverse-flow prevention diode 29.

The voltage from the main power supply 16 is set to be 4.8 V by the reverse-flow prevention Schottky barrier diode 20, the voltage from the solar battery 23 is set to be 4.6 V by the reverse-flow prevention diode 29, and the voltage from the secondary battery 19 is set in correspondence with its charged state. Based on the directions of the reverse-flow prevention Schottky barrier diode 20 and the reverse-flow prevention diode 29, power supply from the main power supply 16 has top priority over other power supplies in an ON state of the main power supply 16, so that the main power supply 16 charges the secondary battery 19 via a resistor 21, and supplies a power as Vcc via the DC—DC converter 22. When this power supply is performed, the solar battery 23 is set at a low potential, and a current does not flow in from the solar battery 23.

When the main power supply 16 is not in operation and the solar battery 23 supplies a power, i.e., when optical energy is supplied although the main power supply 16 is not in operation, if the potential of the secondary battery 19 is higher than that of the solar battery 23, the secondary battery 19 supplies a power as Vcc via the DC—DC converter 22, and the solar battery 23 does not supply any power. On the other hand, if the potential of the secondary battery 19 is lower than that of the solar battery 23, the solar battery 23 supplies a power as Vcc via the DC—DC converter 22, and at the same time, the secondary battery 19 is charged via the resistor 19.

When neither the main power supply 16 nor the solar battery 23 supply a power, the secondary battery 19 supplies a power as Vcc via the DC—DC converter 22. As described above, since the priority order is assigned to power supplies, stable power supply from Vcc can always be achieved.

A microcomputer 17 comprises an 8-bit one-chip microcomputer which can operate with a very low consumption power, and incorporates clock timer means. The microcomputer 17 exchanges data with the CPU 2 via a serial interface sI/O.

Whether or not the solar battery 23 supplies a power is detected by detecting the voltage from the battery 23 by a voltage detect circuit 27. When the detected voltage is higher than 2.5 V, a signal from a port OUT of the voltage detect circuit 27 changes to H (High) level; otherwise, a signal from the port OUT of the circuit 27 changes to L (Low) level. The signal from the port OUT of the voltage detect circuit 27 is input to a port IN8 of the microcomputer 17.

The voltage in a discharged state of the secondary battery 19 is detected by a voltage detect circuit 24. When the detected voltage is higher than 1.2 V, a signal from a port OUT of the voltage detect circuit 24 changes to H level; otherwise, a signal from the port OUT of the circuit 24 changes to L level. The output signal from the port OUT of the voltage detect circuit 24 is input to a port IN9 of the microcomputer 17.

The voltage in a full-charged state of the secondary battery 19 is detected by a voltage detect circuit 28. When the detected voltage is higher than 4.8 V, a signal from a port OUT of the voltage detect circuit 28 changes to H level; otherwise, a signal from the port OUT of the voltage detect circuit 28 changes to Low level. The output signal from the port OUT of the voltage detect circuit 28 is input to a port IN13 of the microcomputer 17.

The DC—DC converter 22 serves as a series regulator when the input voltage is higher than the output voltage, and serves as a booster type switching regulator + series regulator when the input voltage is lower than the output voltage. One of voltages of 5 V and 3 V is selected as the output voltage of the DC—DC converter 22. When an input port SEL of the converter 22 is at H level, the voltage of 5 V is output; when the input port SEL is at L level, the voltage of 3 V is output. When an input Vin of the DC—DC converter 22 is equal to or higher than 0.9 V, the DC—DC converter 22 always outputs a voltage of 5 V or 3 V from its output port Vout.

The microcomputer 17 is reset using the detection result of a voltage detect circuit 18. The voltage detect circuit 18 is used for resetting the microcomputer 17, and its output RE is input to a port RESET of the microcomputer 17. When the voltage output from the port Vout of the DC—DC converter 22 is equal to or lower than 2.7 V, the output RE from the voltage detect circuit 18 is at L level. When the voltage from the port Vout of the DC—DC converter 22 exceeds 2.7 V, the output RE from the voltage detect circuit 18 is held at L level during a delay time required for setting the microcomputer 17, and changes to H level after the microcomputer 17 is reset.

The microcomputer 17 controls a pictograph LCD 25 of the display unit 14, and a key matrix circuit 26 of the console unit 13.

The key matrix circuit 26 performs scanning of various keys in the console unit 13 (i.e., identification of a depressed key), and identifies the depressed key under the software control of the microcomputer 17. The key matrix circuit 26 comprises the sheet detect switch 30 and a hooking switch 31.

The sheet detect switch 30 comprises a mechanical sheet detect switch (or a read switch) arranged in the sheet convey path. Since the mechanical sheet detect switch is used, no power is consumed while the switch is OFF (in a sheet insertion waiting state), and the power of the secondary battery can be prevented from being wasted.

The hooking switch 31 comprises a switch for setting an off-hook or on-hook state.

Figure 3:
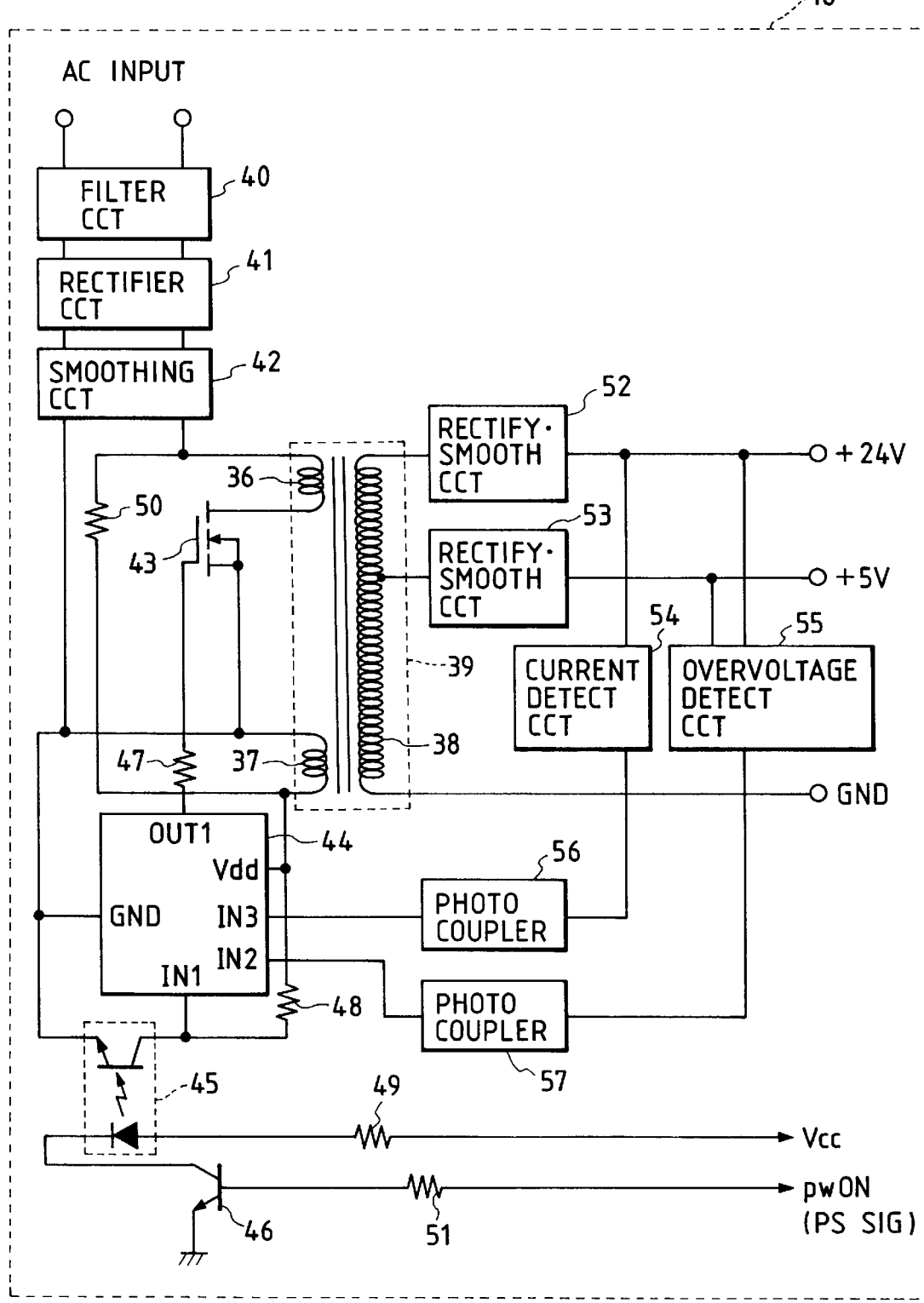
FIG. 3 is a schematic circuit diagram showing the arrangement of a main power supply used in the facsimile apparatus shown in FIG. 1.

The schematic arrangement of the main power supply 16 will be described below with reference to FIG. 3. FIG. 3 is a schematic circuit diagram showing the arrangement of the main power supply.

As shown in FIG. 3, the main power supply 16 has an isolating transformer 39 which receives an AC power via a filter circuit 40, a rectifier circuit 41, and a smoothing circuit 42. The isolating transformer 39 includes a primary winding 36, an auxiliary winding 37, and a secondary winding 38. A voltage to be applied to the primary winding 36 and the auxiliary winding 37 is switched by an FET 43. A voltage induced in the secondary winding 38 of the isolating transformer 39 is supplied to the respective units of the facsimile apparatus 1 as power supply voltages of +24 V and +5 V via rectify·smooth circuits 52 and 53.

The gate of the FET 43 is connected to a port OUT1 of a control IC 44 via a resistor 47, and the operation of the FET 43 is controlled by the control IC 44.

The current from the rectify·smooth circuit 52 is detected by a current detect circuit 55, and the output from a current detect circuit 54 is fed back to the control IC 44 via a photo coupler 56.

The voltage from the rectify·smooth circuit 53 is detected by an overvoltage detect circuit 55, and the output from the overvoltage detect circuit 55 is fed back to the control IC 44 via a photo coupler 57.

A PS signal (pwON) from the microcomputer 17 in the main power supply control unit 15 is supplied to the control IC 44 via a resistor 51 for limiting a current, a transistor 46, and a photo coupler 45.

The control IC 44 performs oscillation control of the primary side of the isolating transformer 39, and receives a power supply voltage Vdd from the auxiliary winding 37 of the isolating transformer 39. The control IC 44 performs PWM control based on the current on the secondary side, and performs control for shutting down the entire system upon detection of an overvoltage. The resistor inserted between the port OUT1 of the control IC 44 and the primary winding 36 is a current limiting resistor.

When the PS signal is at H level, the transistor 46 is enabled, and a current flows through the photo coupler 45, so that the photo coupler 45 performs current-voltage conversion. The light-emitting portion of the photo coupler 45 is connected to the voltage Vcc via a resistor 49, and its light-receiving portion is connected to the auxiliary winding 37 via a resistor 48. Upon operation of the photo coupler 45, an input port IN1 of the control IC 44 changes to L level, and the output port OUT1 of the control IC 44 oscillates accordingly. An oscillation signal from the output port OUT1 is supplied to the FET 43 via the resistor 47, so that the FET 43 performs a switching operation. Upon switching operation of the FET 43, the primary side oscillates, and power supply to the secondary side is performed. The main power supply 16 is turned on by a power supplied to the secondary side, and starts its operation.

When the PS signal is at L level, the transistor 46 is disabled, and the port IN1 of the control IC 44 changes to H level. In response to H level of the port IN1, the output port OUT1 of the control IC 44 changes to L level, and the FET 43 is disabled. Since the FET 43 is disabled, oscillation on the primary side is stopped, and the main power supply 16 stops or suspends its operation. For example, when the hooking switch 31 (FIG. 2) is depressed in a stand-by state, the key matrix circuit 26 outputs an ON signal, and the microcomputer 17 recognizes the depression of the hooking switch 31 and turns on the main power supply 16 by setting its port OUT5 at H level, i.e., setting the PS signal at H level. ON information of the main power supply 16 is supplied to the CPU 2 via the serial interface sI/O, and the CPU 2 controls the NCU 10 to set the facsimile apparatus 1 in an off-hook state.

Figure 4:
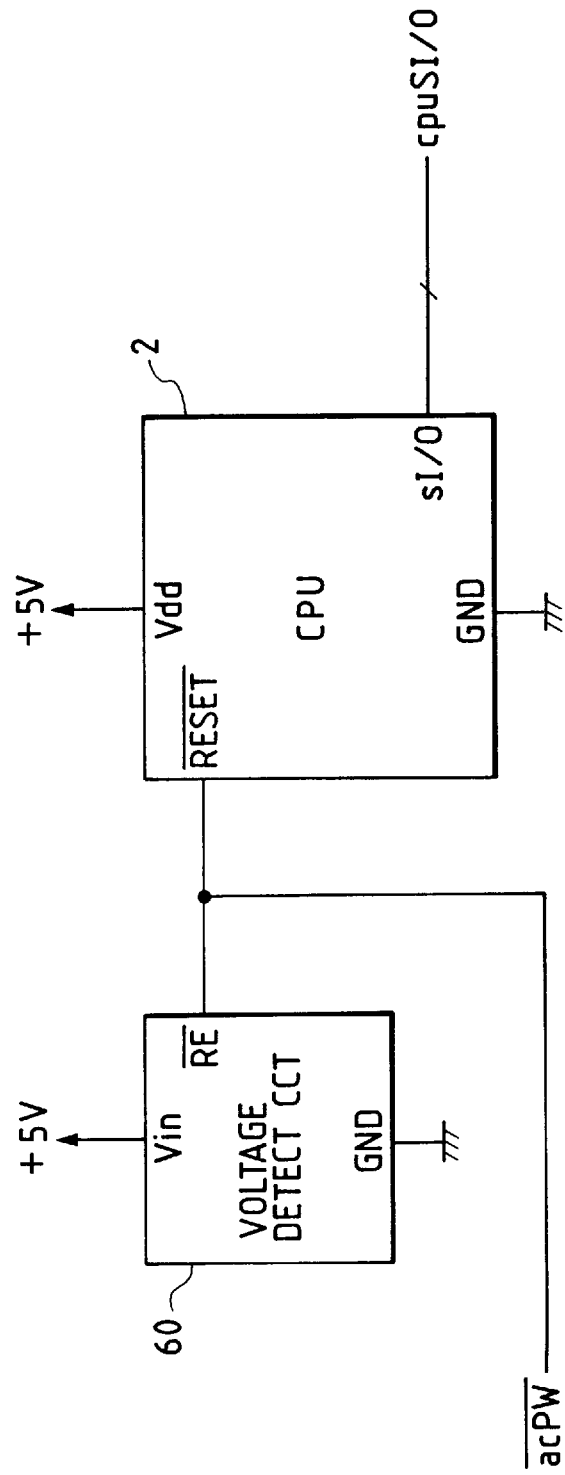
FIG. 4 is a diagram showing a CPU and its peripheral circuits used in the facsimile apparatus shown in FIG. 1.

The arrangement of the CPU 2 and its peripheral circuits will be described below with reference to FIG. 4. FIG. 4 is a diagram showing the circuit arrangement of the CPU and its peripheral circuits used in the facsimile apparatus shown in FIG. 1.

In the reset operation of the CPU 2, a voltage detect circuit 60 is used, as shown in FIG. 4. The voltage detect circuit 60 is a circuit for resetting the CPU 2, and its output RE is input to the port RESET of the CPU 2. When the voltage from the main power supply 16 is equal to or lower than 4.5 V, the output level of the output RE from the voltage detect circuit 60 is L level. On the contrary, when the voltage from the main power supply 16 exceeds 4.5 V, the output level of the output RE from the voltage detect circuit 60 maintains L level for a delay time required for resetting the CPU 2, and changes to H level after the CPU 2 is reset. The output RE is also input to a port IN10 of the microcomputer 17 so as to be monitored.

Figure 5:
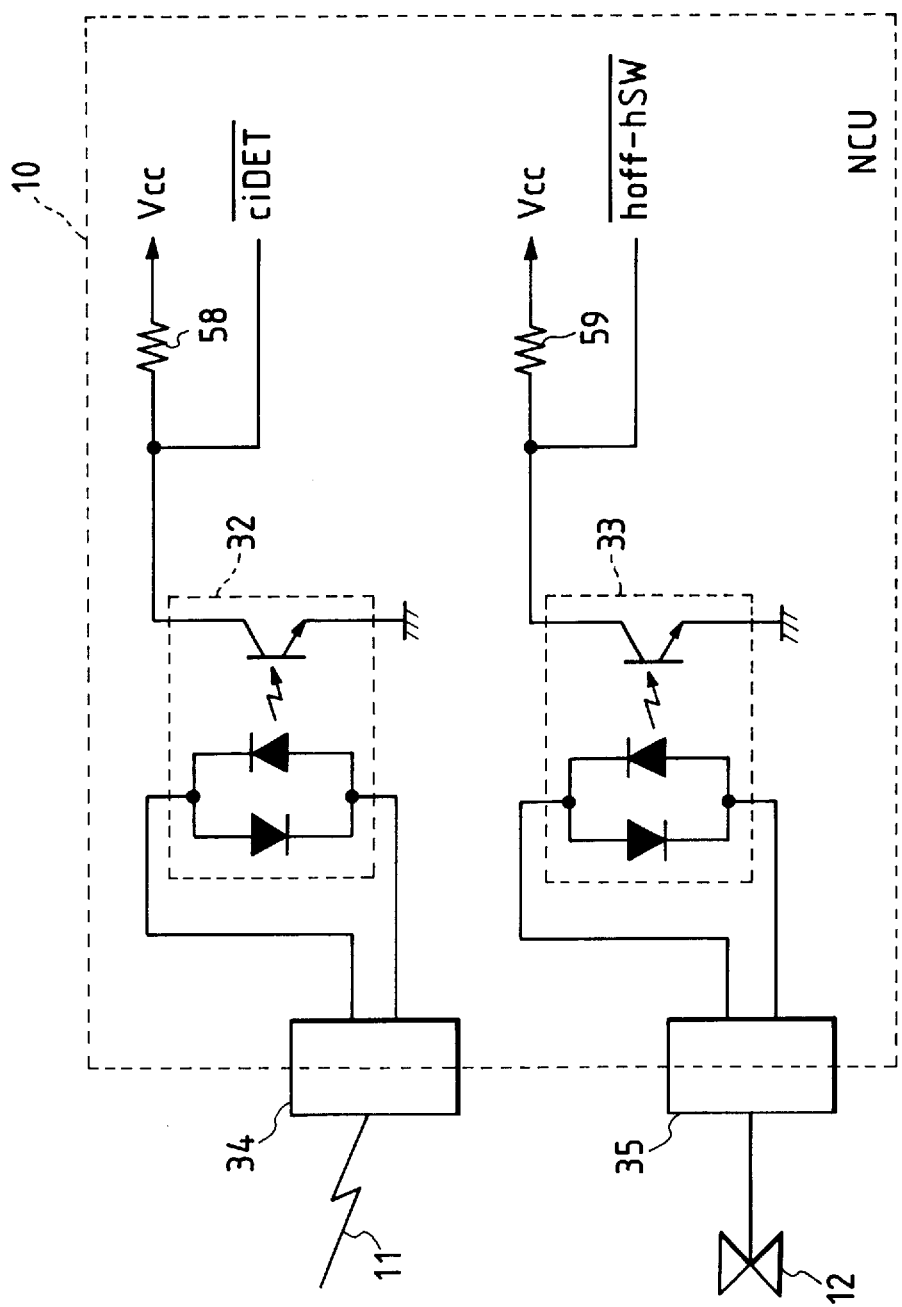
FIG. 5 is a partial circuit diagram showing the circuit arrangement of an NCU used in the facsimile apparatus shown in FIG. 1.

The partial circuit arrangement of the NCU 10 will be described below with reference to FIG. 5. FIG. 5 is a partial circuit diagram showing the circuit arrangement of the NCU used in the facsimile apparatus shown in FIG. 1.

As shown in FIG. 5, the NCU 10 comprises a photo coupler 32 which has a light-emitting portion connected to the telephone line 11 via a modular jack 34, and a light-receiving unit connected to the voltage Vcc via a resistor 58, and a photo coupler 33 which has a light-emitting portion connected to the telephone set 12 via a modular jack 35, and a light-receiving portion connected to the voltage Vcc via a resistor 59.

The photo coupler 32 is used for detecting a calling signal (CI signal). Upon reception of a calling signal via the telephone line 11, the photo coupler 32 inputs an incoming call detection signal (L level) to a port IN12 of the microcomputer 17. When the calling signal is received in a stand-by state, the incoming call detection signal (L level) is input to the microcomputer 17, and the microcomputer 17 recognizes it and turns on the main power supply 16 by setting its port OUT5 at H level, i.e., setting the PS signal at H level. ON information of the main power supply 16 is supplied to the CPU 2 via the serial interface sI/O, and the CPU 2 controls the respective units in accordance with the received information.

The photo coupler 33 is used for detecting an off-hook state of the telephone set 12. When the telephone set 12 is set in an off-hook state, the photo coupler 33 inputs an L-level signal to a port IN11 of the microcomputer 17. When the telephone set 12 is set in the off-hook state in a stand-by state, the L-level signal is input to the microcomputer 17, and the microcomputer recognizes it and turns on the main power supply 16 by setting its port OUT5 at H level, i.e., setting the PS signal at H level. ON information of the main power supply 16 is supplied to the CPU 2 via the serial interface sI/O, and the CPU 2 controls the respective units in accordance with the received information.

The operation of the facsimile apparatus of this embodiment will be described below with reference to the accompanying drawings.

Figure 6:
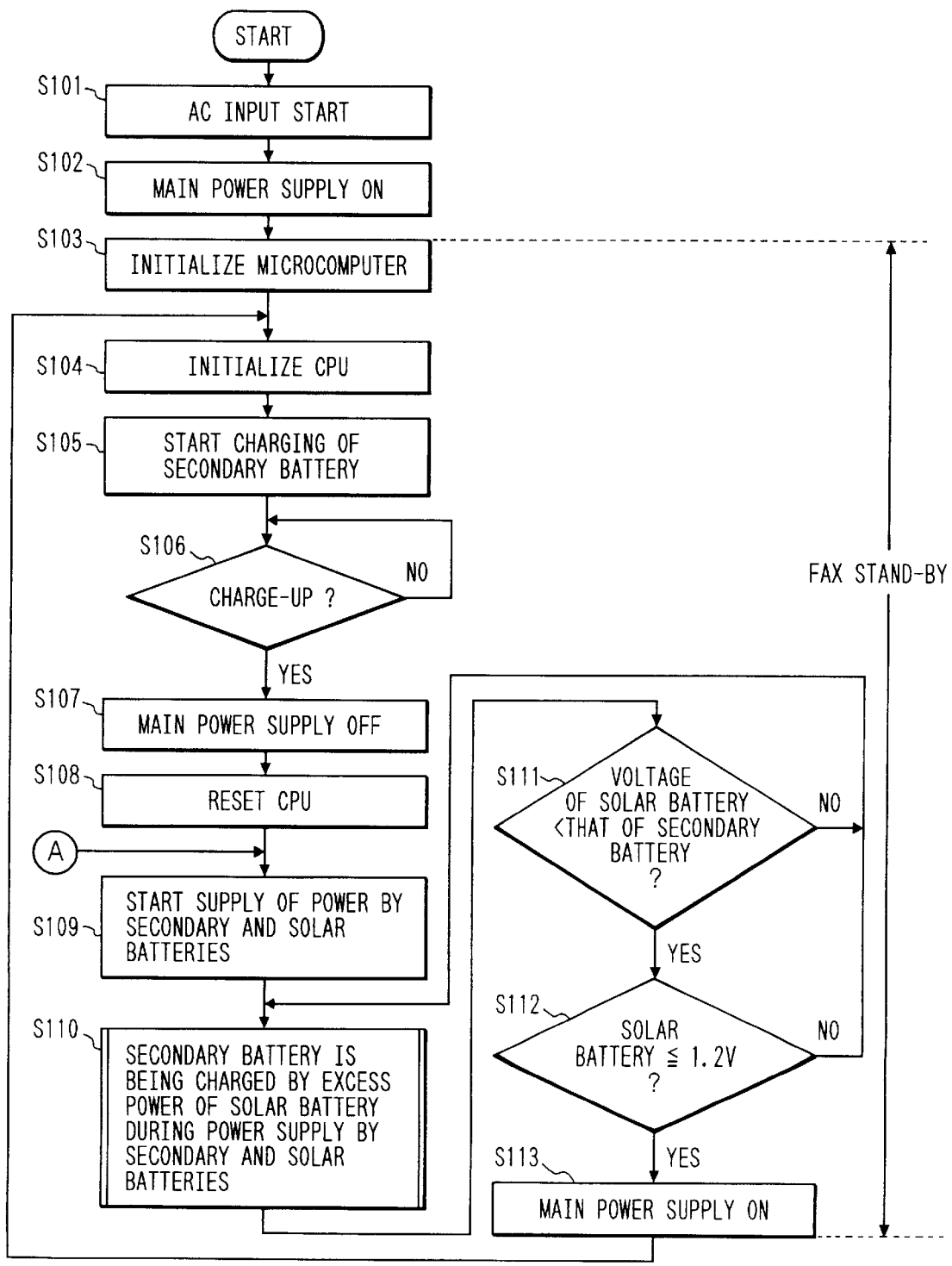
FIG. 6 is a flow chart showing the operation in a FAX stand-by state of the facsimile apparatus shown in FIG. 1.

The operation in a stand-by state will be explained first with reference to FIG. 6. FIG. 6 is a flow chart showing the operation in a FAX stand-by state of the facsimile apparatus shown in FIG. 1.

When an AC input is started (step S101), the main power supply 16 is turned on (step S102). Then, initialization of the microcomputer 17 (step S103) and initialization of the CPU 2 (step S104) are sequentially executed. Upon completion of the initialization of the microcomputer 17, the stand-by state of the facsimile apparatus 1 is started.

After the initialization of the CPU 2 is completed, charging of the secondary battery 19 is started (step S105), and is continued in the stand-by state.

It is checked based on the output from the voltage detect circuit 28 and the charging continuation time if the secondary battery 19 is charged up (step S106).

It is determined that the secondary battery is charged up when the output from the voltage detect circuit 28 is at H level or when the internal clock timer means of the microcomputer 17 has measured one hour as the charging time.

In the former case, since the port IN13 of the microcomputer 17 changes to H level, the microcomputer 17 stops the operation of the main power supply 16 by setting its port OUT5, i.e., the PS signal at L level accordingly (step S107). When the operation of the main power supply 16 is stopped, the output RE from the voltage detect circuit 60 changes to L level, and the CPU 2 is reset (step S108). Then, power supply by only the secondary battery 19 and the solar battery 23 is started (step S109).

In the latter case, an interrupt is generated, and the microcomputer stops the operation of the main power supply 16 by setting its port OUT5, i.e., the PS signal at L level accordingly (step S107). When the operation of the main power supply 16 is stopped, the output RE from the voltage detect circuit 60 changes to L level, and the CPU 2 is reset (step S108). Then, power supply from the secondary battery 19 and the solar battery 23 is started.

After the power supply from the secondary battery 19 and the solar battery 23 is started, the secondary battery 19 is charged by an excess power of the power supplied from the solar battery 23 (step S110).

It is checked if the potential of the solar battery 23 is lower than that of the secondary battery 19 (step S111). If the potential of the solar battery 23 is lower than that of the secondary battery 19 due to a decrease in power supplied from the solar battery 23, it is checked if the voltage from the secondary battery 19 is equal to or lower than 1.2 V. (step S112). If the potential of the solar battery 23 is lower than that of the secondary battery 19 due to a decrease in power supplied from the solar battery 23, and the voltage from the secondary battery 19 becomes equal to or lower than 1.2 V, the signal from the port OUT of the voltage detect circuit 24 changes to L level, and the signal from the port IN9 of the microcomputer 17 changes to L level. Then, the microcomputer 17 sets its port OUT5, i.e., the PS signal at H level. In response to the H-level PS signal, the transistor 46 is enabled, the photo coupler 45 is turned on, and the port IN1 of the control IC 44 changes to L level. When the level of the port IN1 changes to L level, the port OUT1 of the control IC 44 oscillates, and the primary side oscillates upon operation of the FET 43, thus supplying a power to the secondary side. Upon power supply to the secondary side, the main power supply 16 is turned on (step S113). When the main power supply 16 is turned on, the voltage detect circuit 60 initializes the CPU 2, and the main power supply 16 begins to charge the secondary battery 19. Thus, the secondary battery 19 is charged again while maintaining the FAX stand-by state, and this cycle is repeated.

Figure 7:
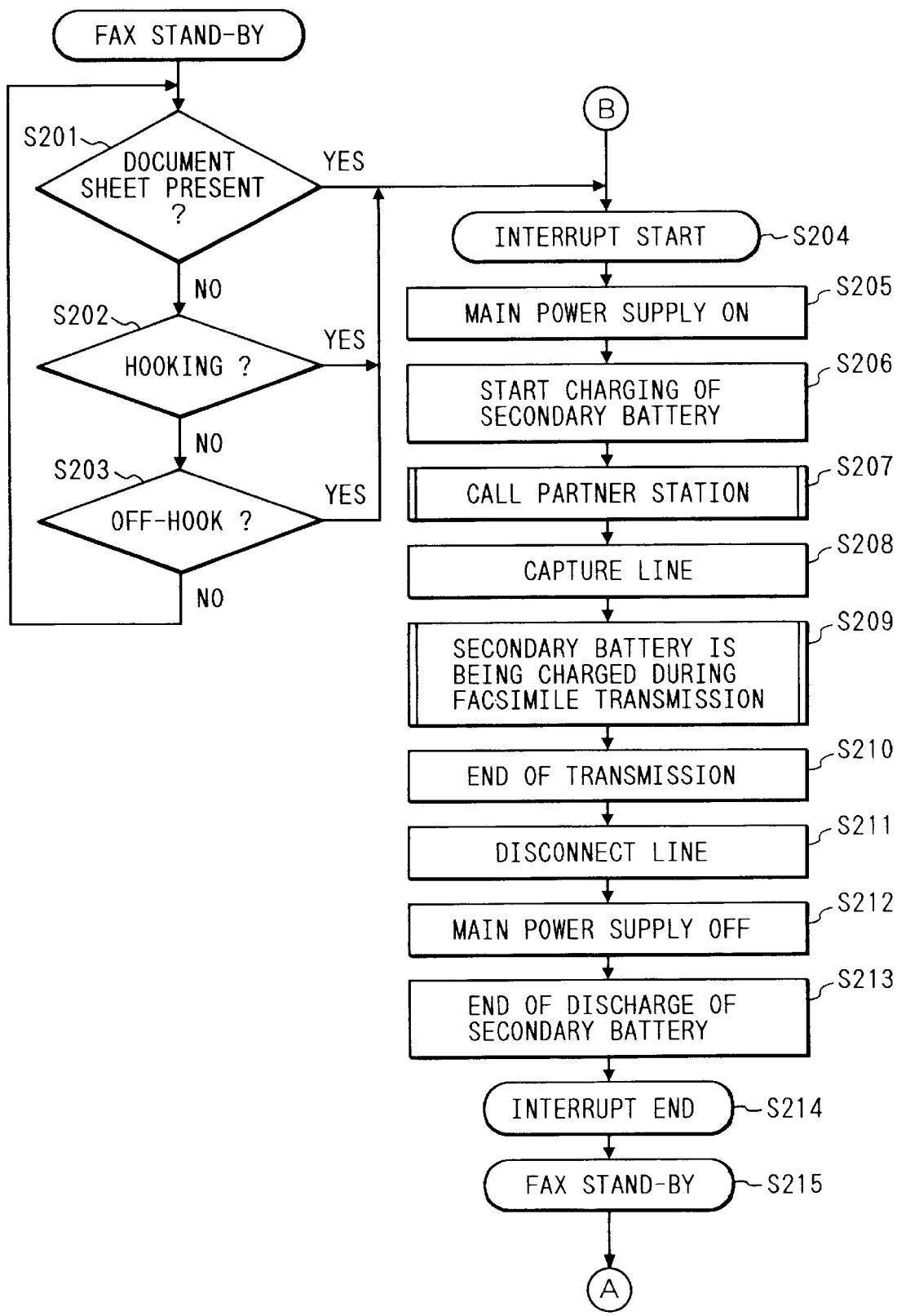
FIG. 7 is a flow chart showing the interrupt routine for FAX transmission in the FAX stand-by state of the facsimile apparatus shown in FIG. 1.

The interrupt routine upon FAX transmission in the FAX stand-by state will be described below with reference to FIG. 7. FIG. 7 is a flow chart showing the interrupt routine upon FAX transmission in the FAX stand-by state.

In the FAX stand-by state, when a document sheet is inserted (step S201), when the hooking button is depressed (step S202), or when the handset is set in an off-hook state (step S203), the sheet detect switch 30, the hooking switch 31, or the photo coupler 33 is turned on, and an ON signal or a sheet detection signal is input to the microcomputer 17, thus starting an interrupt (step S204). The microcomputer 17 turns on the photo coupler 45 by setting its port OUT5, i.e., the PS signal at H level. When the photo coupler 45 is turned on, the control IC 44 controls the primary side to oscillate via the FET 43 and to supply a power to the secondary side, thereby turning on the main power supply 16 (step S205).

When the main power supply 16 is turned on, charging of the secondary battery 19 is started (step S206). During the operation of the main power supply 16, the secondary battery 19 is always charged. ON information of the main power supply 16 is supplied to the CPU 2 via the serial interface sI/O, and the following operation control of the facsimile apparatus 1 is mainly executed by the CPU 2. In this state, when a call is generated to a partner station (step S207) and a line is captured (step S208), normal facsimile transmission is performed (step S209). When the transmission ends (step S210), and the line is disconnected (step S211), information indicating this is supplied to the microcomputer 17 via the serial interface sI/O, and the microcomputer 17 stops the operation of the main power supply 16 by setting the PS signal at L level accordingly (step S212). Then, the charging operation of the secondary battery 19 is ended (step S213), and the interrupt ends (step S214). After the end of the interrupt, the apparatus is set in the FAX stand-by state, and the flow returns to step S109 (FIG. 6).

Figure 8:
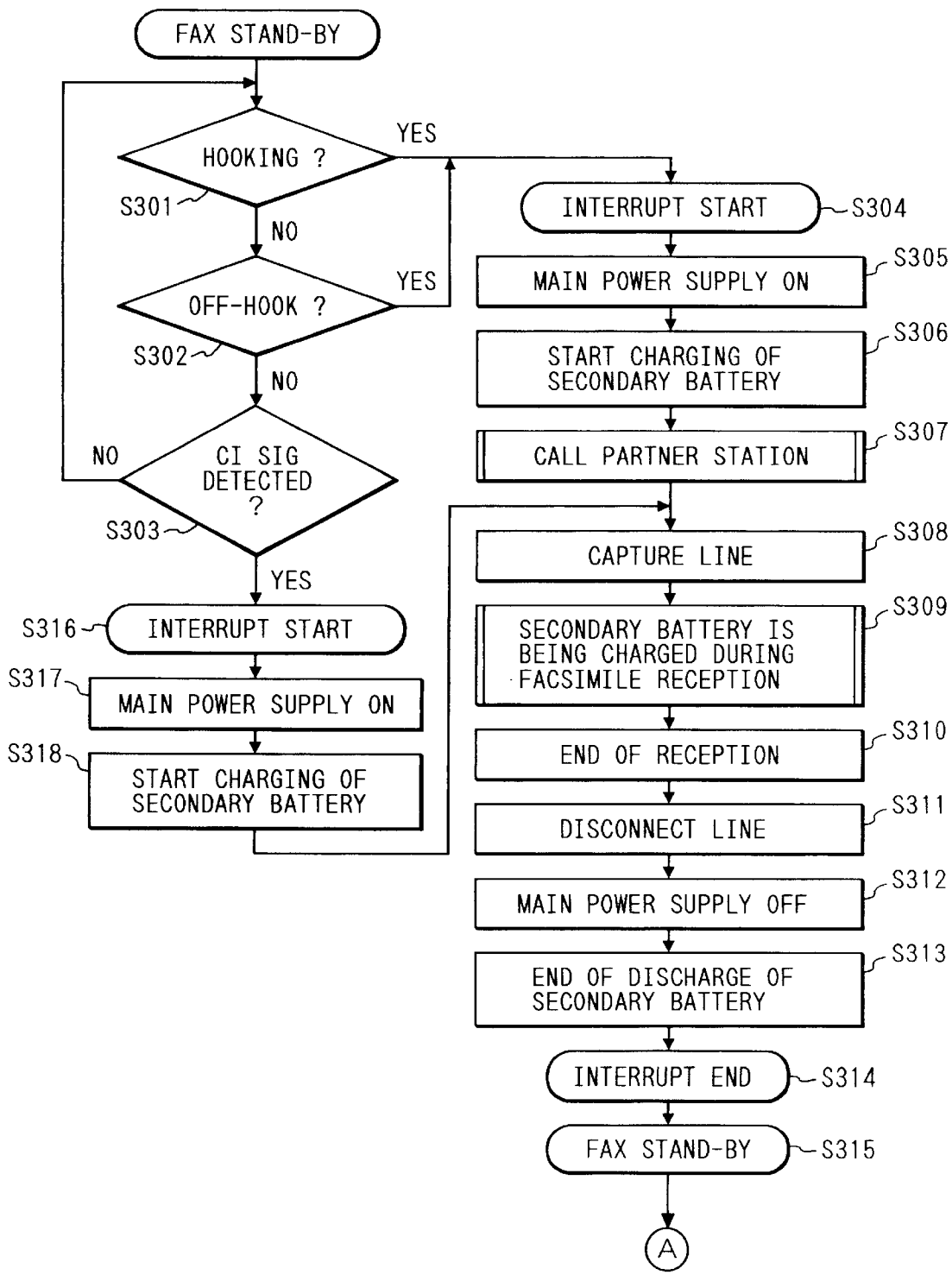
FIG. 8 is a flow chart showing the interrupt routine for FAX reception in the FAX stand-by state of the facsimile apparatus shown in FIG. 1.

The interrupt routine upon FAX reception in the FAX stand-by state will be described below with reference to FIG. 8. FIG. 8 is a flow chart showing the interrupt routine upon FAX reception in the FAX stand-by state.

In the FAX stand-by state, when the hooking button is depressed (step S301), or when the handset is set in an off-hook state (step S302), the hooking switch 31 or the photo coupler 33 is turned on, and an ON signal is input to the microcomputer 17, thus starting an interrupt (step S304).

When the interrupt is started, the microcomputer 17 turns on the photo coupler 45 by setting its port OUT5, i.e., the PS signal at H level. When the photo coupler 45 is turned on, the control IC 44 controls the primary side to oscillate via the FET 43 and to supply a power to the secondary side, thereby turning on the main power supply 16.

On the other hand, when a calling signal (CI signal) is detected (step S303), the photo coupler 32 is turned on, and an ON signal of the photo coupler 32 is input to the microcomputer 17, thus starting an interrupt (step S316). When the interrupt is started, the microcomputer 17 turns on the photo coupler 45 by setting its port OUT5, i.e., the PS signal at H level. When the photo coupler 45 is turned on, the control IC 44 controls the primary side to oscillate via the FET 43 and to supply a power to the secondary side, thereby turning on the main power supply 16 (step S317).

In the FAX stand-by state, when the hooking button is depressed (step S301), when the handset is set in an off-hook state (step S302), or when a calling signal is detected (step S303), the interrupt is started (step S304 or S316). The main power supply 16 is turned on (step S305 or S317), and charging of the secondary battery 19 is started (step S306 or S318). During the operation of the main power supply 16, the secondary battery 19 is always charged. Then, this information is supplied to the CPU 2 via the serial interface sI/O, and thereafter, the operation control of the facsimile apparatus 1 is executed by the CPU 2.

When the hooking button is depressed or when the handset is set in an off-hook state, a call is generated to a partner FAX station (step S307). When the NCU 10 captures a line (step S308), normal facsimile reception is performed.

When a calling signal is detected, the NCU 10 captures a line, and facsimile reception is automatically performed.

When the reception ends and the line is disconnected (step S310), information indicating this is supplied to the microcomputer 17 via the serial interface sI/O, and the microcomputer 17 stops the operation of the main power supply 16 by setting the PS signal at L level (step S312).

Then, the charging operation of the secondary battery 19 ends (step S313), and the interrupt ends (step S314). After the end of the interrupt routine, the apparatus is set in the FAX stand-by state (step S315), and the flow then returns to step S109 in FIG. 6.

Figure 9:
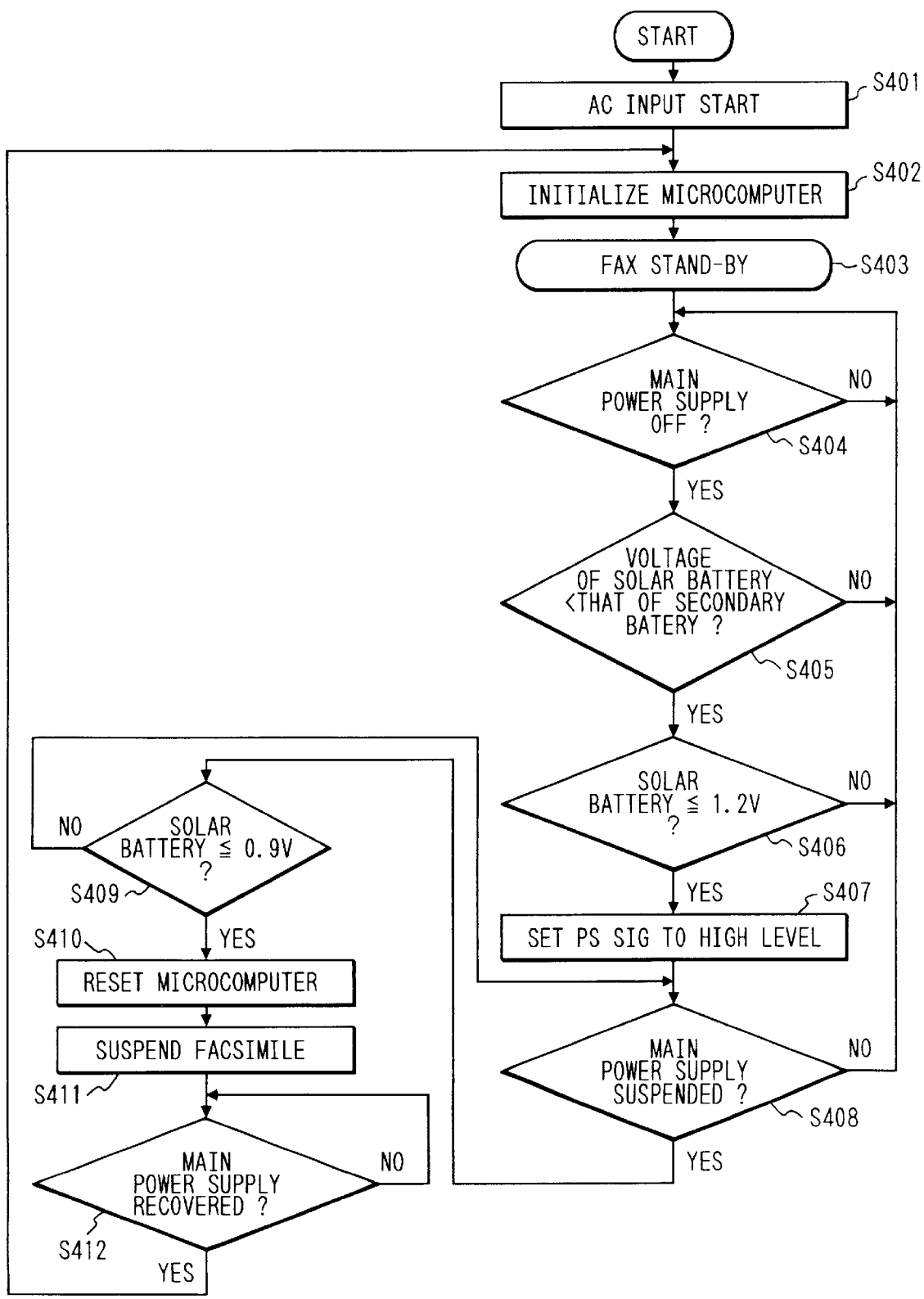
FIG. 9 is a flow chart showing the reset operation of a microcomputer in the main power supply control unit used in the facsimile apparatus shown in FIG. 1.

The reset operation of the microcomputer 17 will be described below with reference to FIG. 9. FIG. 9 is a flow chart showing the reset operation of the microcomputer.

Referring to FIG. 9, when the input Vin of the voltage detect circuit 18 exceeds 2.7 V upon starting of an AC input (step S401), the output RE of the voltage detect circuit 18 is maintained at L level for a delay time required for resetting the microcomputer 17, and during this time, the microcomputer 17 is initialized (reset) (step S402). After the microcomputer 17 is reset, the output RE from the voltage detect circuit 18 changes to H level, and the apparatus shifts to the FAX stand-by state (step S403).

Thereafter, it is sequentially checked if the operation of the main power supply 16 is stopped (step S404), if the potential of the solar battery 23 is lower than that of the secondary battery 19 (step S405), and if the voltage from the secondary battery 19 is equal to or lower than 1.2 V (step S406).

If the operation of the main power supply is stopped, the potential of the solar battery 23 is lower than that of the secondary battery 19, and the voltage from the secondary battery 19 is equal to or lower than 1.2 V, the microcomputer 17 sets its port OUT5 at H level, i.e., sets the PS signal at H level (step S407).

It is sequentially checked if the operation of the main power supply 16 is stopped due to other causes such as a power failure (step S408) and if the voltage from the secondary battery 19 is equal to or lower than 0.9 V (step S409). If the main power supply 16 does not operate and the voltage from the secondary battery 19 becomes equal to or lower than 0.9 V, the output RE from the voltage detect circuit 18 changes to L level, and the microcomputer 17 is reset (step S410). When the microcomputer 17 is reset, the facsimile apparatus 1 suspends its operation (step S411).

The facsimile apparatus 1 is kept suspended after the operation of the facsimile apparatus 1 is suspended until the main power supply 16 is recovered (step S412). When the input Vin of the voltage detect circuit 18 exceeds 2.7 V when the operation of the main power supply 16 is recovered due to recovery of an AC input, the output RE from the voltage detect circuit 18 is maintained at L level for a delay time required for resetting the microcomputer 17, and during this delay time, the microcomputer 17 is initialized (reset) (step S402). After the microcomputer 17 is reset, the output from the voltage detect circuit 18 changes to H level, and the apparatus is set in the FAX stand-by state (step S403).

With the above-mentioned control, since the voltage to be supplied from the main power supply control unit 15 to the microcomputer 17 is maintained to be a constant voltage using the DC—DC converter 22 independently of the charged state of the secondary battery 19, the microcomputer 17 need not cope with a wide operating voltage range.

When the output voltage from the DC—DC converter 22 is set to be low, the consumption power of the main power supply control unit 15 can be saved, and the power of the secondary battery 19 can be prevented from being wasted.

Furthermore, the charging start voltage of the secondary battery 19 can be set to be lower than the minimum operating voltage of the microcomputer 17, and the capacity of the secondary battery 19 can be sufficiently utilized. As a result, the discharging cycle can be prolonged, and an increase in charging frequency can be suppressed.

(Second Embodiment)

In the second embodiment, only portions different from the first embodiment will be explained, and a description of the same portions will be omitted by denoting the same parts by the same reference numerals.

Figure 10:
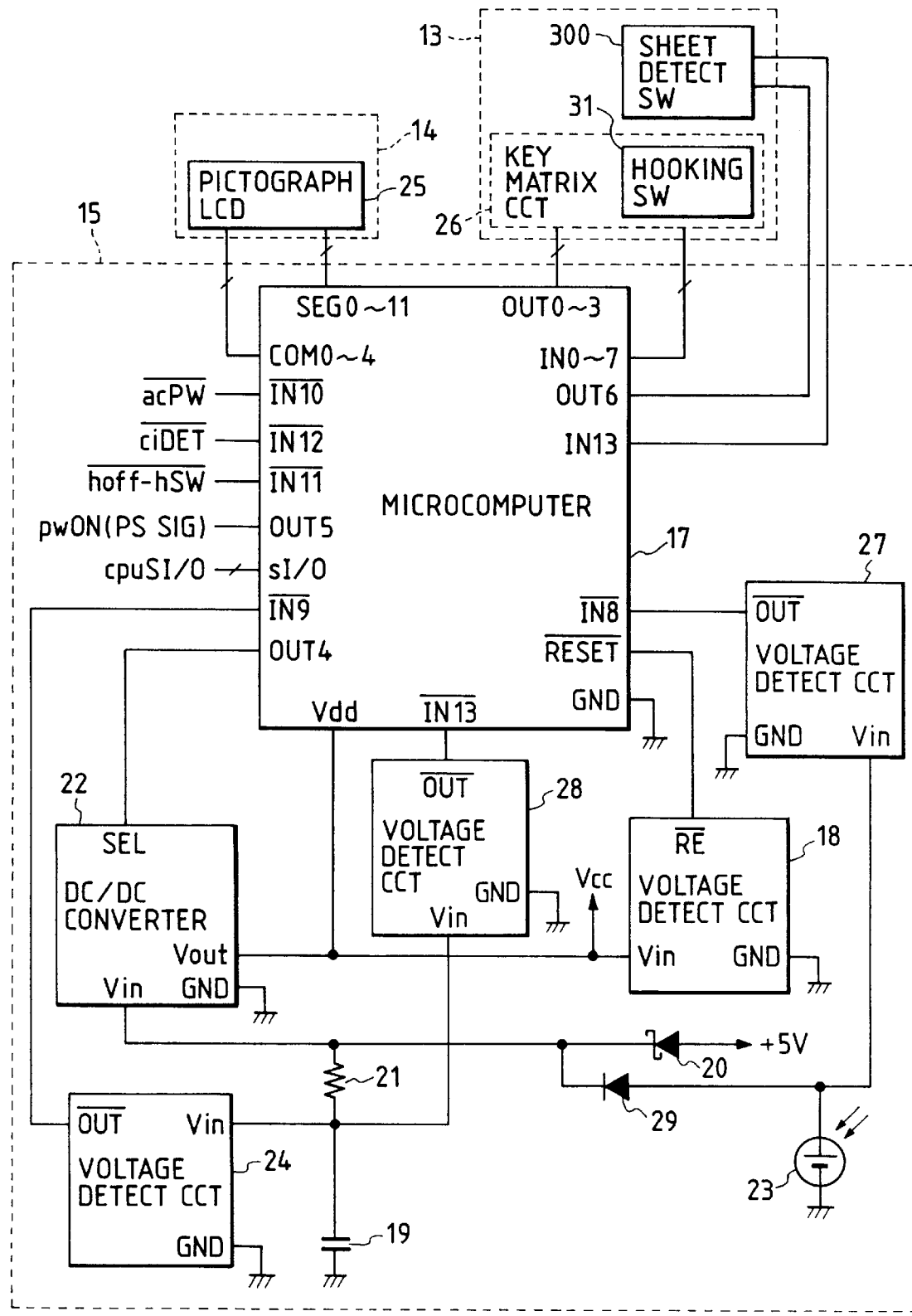
FIG. 10 is a schematic circuit diagram showing the arrangement of a main power supply control unit and its peripheral circuits in a facsimile apparatus according to the second embodiment of the present invention.

The embodiment in FIG. 10 differs from that in FIG. 2 in a sheet detect unit 300.

The sheet detect unit 300 is arranged in the convey path of a document sheet, and comprises a photo sensor using a light-emitting element, a transistor, and the like. The sheet detect unit 300 receives the voltage Vcc as its driving voltage. Upon reception of an H-level signal from a port OUT6 of the microcomputer 17, the sheet detect unit 300 performs a document sheet detection operation by controlling the photo sensor to emit light, and upon reception of an L-level signal from the port OUT6 of the microcomputer 17, the sheet detect unit 300 stops the sheet detection operation by controlling the photo sensor to stop light emission. When a document sheet is not detected, the port IN13 of the microcomputer 17 changes to L level.

Figure 11:
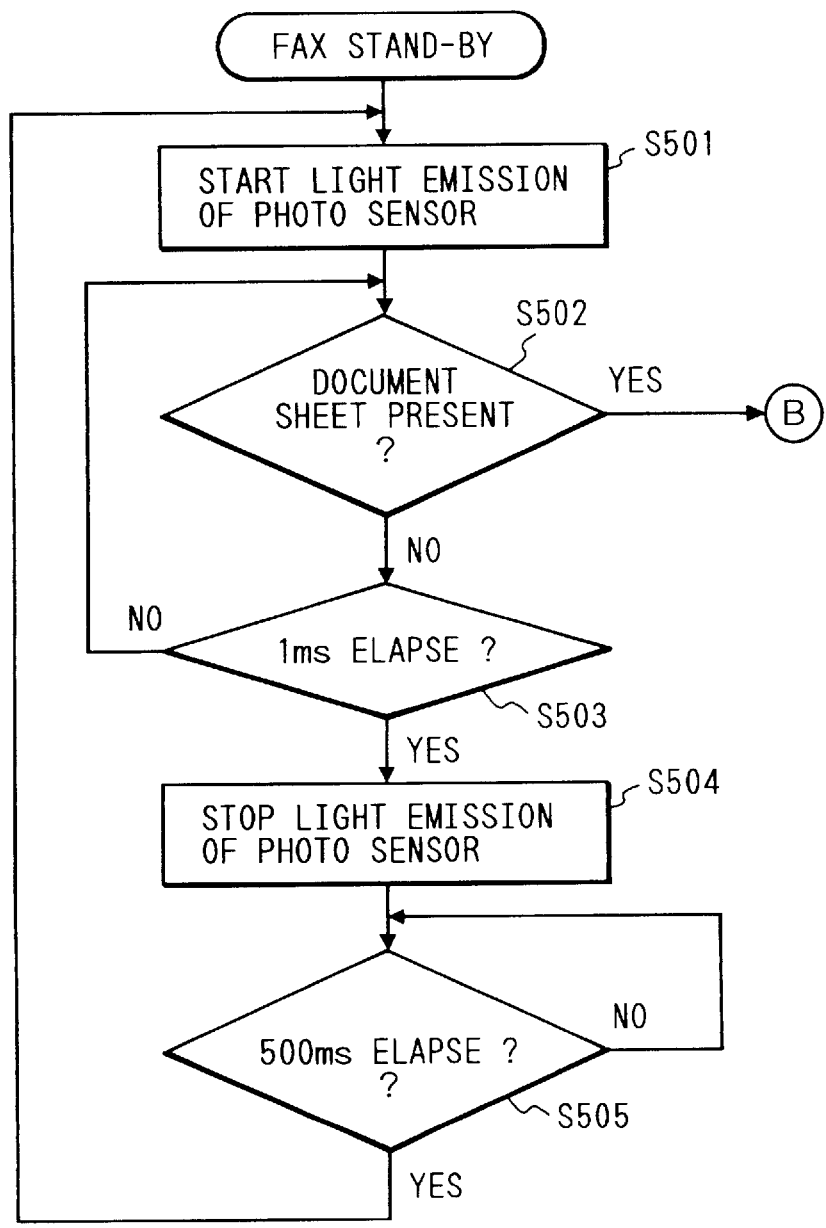
FIG. 11 is a flow chart showing the interrupt routine for sheet detection in a FAX stand-by state of the facsimile apparatus of the second embodiment.

The interrupt routine for sheet detection in a FAX stand-by state will be described below with reference to FIG. 11. FIG. 11 is a flow chart showing the interrupt routine for sheet detection in a FAX stand-by state of the facsimile apparatus of the second embodiment.

When the operation of the main power supply 16 is suspended in the FAX stand-by state, as shown in FIG. 11, the microcomputer 17 controls the photo sensor of the sheet detect unit 300 to start light emission by changing the level of its port OUT6 to H level (step S501).

It is sequentially checked if a document sheet is detected by light emitted by the photo sensor (step S502) and if 1 ms has elapsed as the light emission ON time of the photo sensor (step S503). If a document sheet is detected, the processing from step S204 (FIG. 7) is executed. On the other hand, if a document sheet is not detected, the light emission of the photo sensor is continued for 1 ms. When 1 ms has elapsed as the light emission ON time of the photo sensor, the port OUT6 of the microcomputer 17 is set at L level, and the light emission of the photo sensor of the sheet detect unit 300 is stopped (step S504).

The light emission OFF time of the photo sensor is measured (step S505). If 500 ms have elapsed as the light emission OFF time, the light emission of the photo sensor is restarted, and the sheet detection operation is performed. By repeating start and stop of the light emission of the photo sensor, since sheet detection is performed for a 1-ms period once per 500-ms period, the consumption power required for sheet detection can be saved, and the secondary battery 19 can be prevented from being wasted. Since the light emission time of the photo sensor can be shortened, the service life of the photo sensor can be prolonged. Furthermore, since the stop time of the sheet detection operation is set to be 500 ms, and the sheet detection operation time is set to be 1 ms shorter than its stop time, the consumption power can be further saved, and the secondary battery can be prevented from being wasted. Furthermore, since the sheet detection operation time and its stop time are set to be constant times, the system can be efficiently constituted. The reason why the sheet detection stop time is set to be 500 ms is to match the interrupt generation timing of a timer for measuring a time, which is generated once per 500 ms to the microcomputer 17. Thus, the system can be efficiently constituted, and a wasteful consumption power can be eliminated. Furthermore, in consideration of sheet detection upon insertion of a document sheet, the sheet detection operation stop time of 500 ms does not trouble a user.

While the main power supply 16 is in operation, the port OUT6 of the microcomputer 17 is always held at H level, and sheet detection is performed by light emission of the photo sensor of the sheet detect unit 300, thereby preventing a detection error of a document sheet upon convey of a document sheet during the operation.

(Third Embodiment)

In the third embodiment, only portions different from the first embodiment will be explained, and a description of the same portions will be omitted by denoting the same parts by the same reference numerals.

Figure 12:
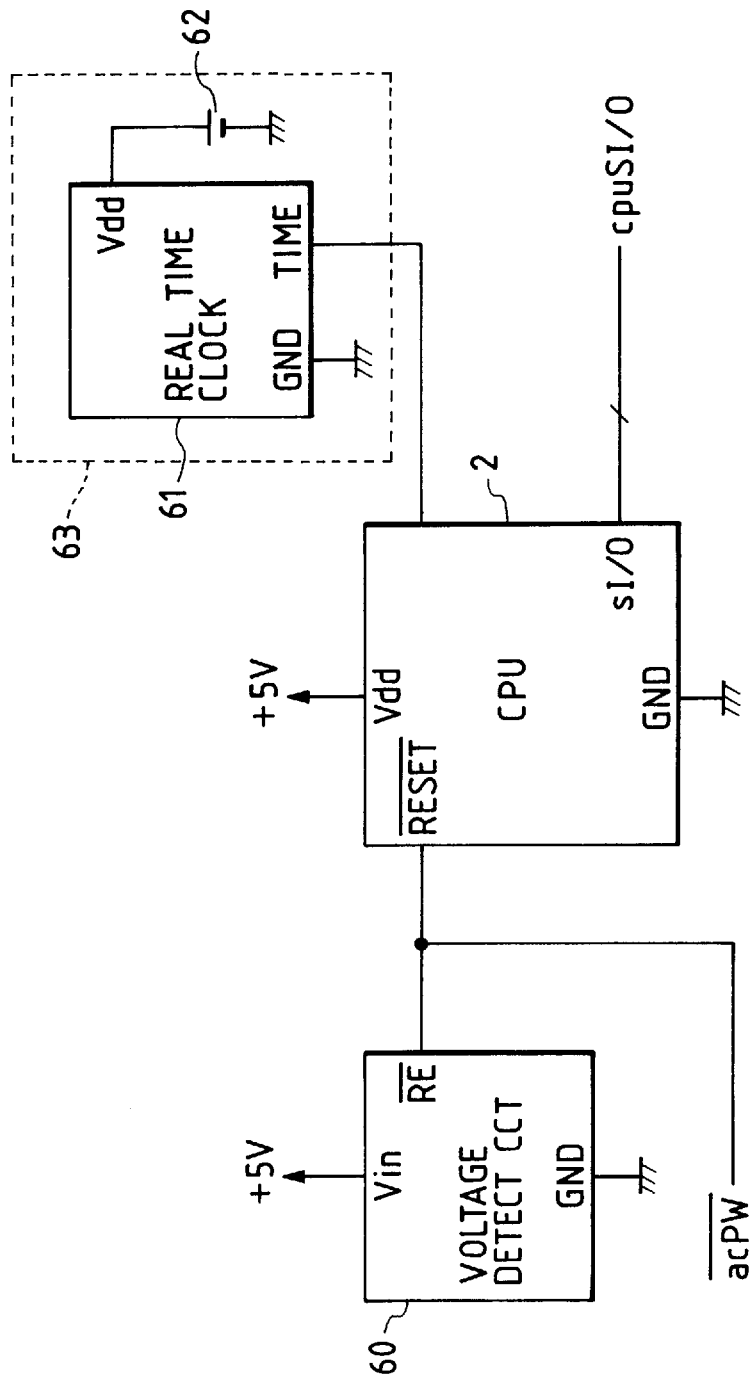
FIG. 12 is a diagram showing the circuit arrangement of a CPU and its peripheral circuits used in a facsimile apparatus according to the third embodiment of the present invention.

The CPU 2 and its peripheral circuits of the third embodiment will be described below with reference to FIG. 12. FIG. 12 is a diagram showing the circuit arrangement of the CPU and its peripheral circuits used in a facsimile apparatus of the third embodiment.

The CPU 2 reads out an accurate time from a real time clock unit 63. The real time clock unit 63 comprises a primary battery 62 which is independent from the main power supply 16, and a real time clock 61 which is driven by a power from the primary battery 62 and measures an accurate time.

Figure 13:
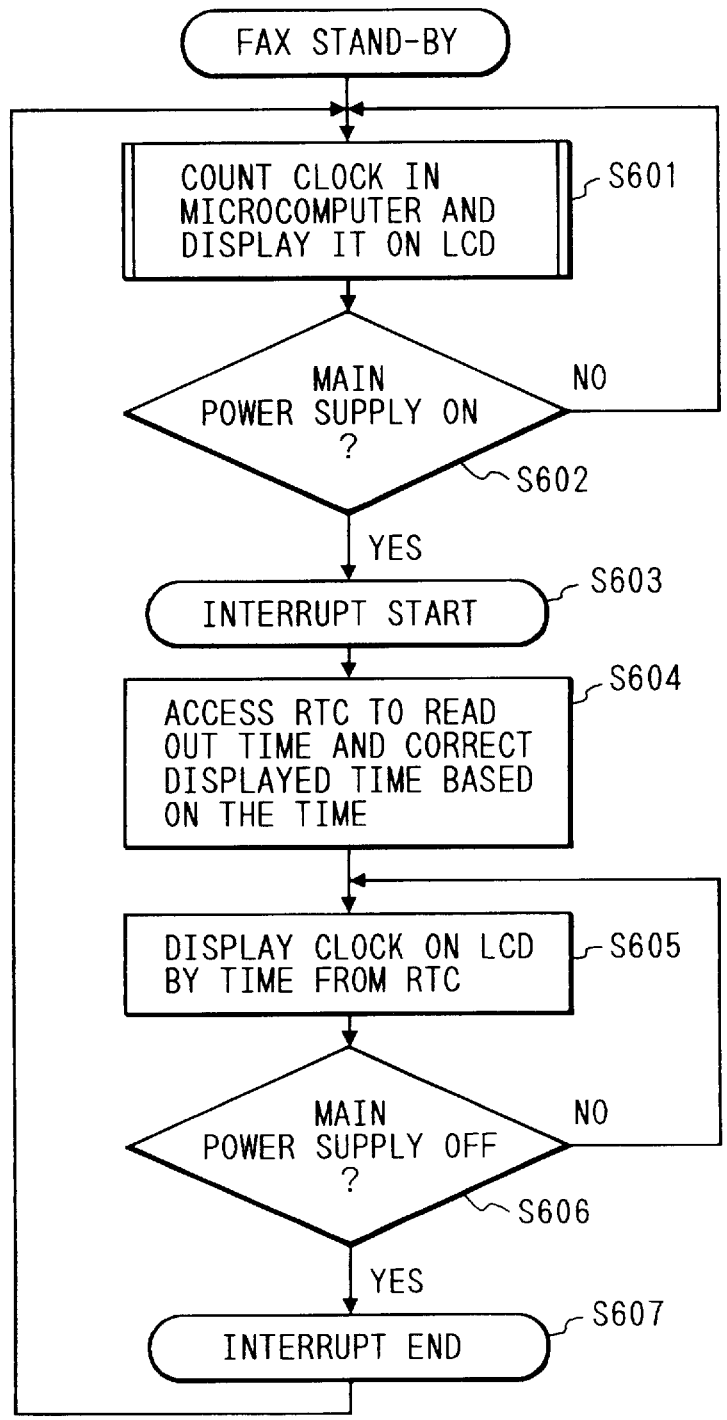
FIG. 13 is a flow chart showing the interrupt routine for time correction in the FAX stand-by state of the facsimile apparatus of the third embodiment.

The interrupt routine for time correction in a FAX stand-by state will be described below with reference to FIG. 13. FIG. 13 is a flow chart showing the interrupt routine for time correction in the FAX stand-by state.

When the operation of the main power supply 16 is suspended in the FAX stand-by state, as shown in FIG. 13, the time is measured by the internal clock timer means of the microcomputer 17, and the measured time is displayed on the pictograph LCD 25 (step S601).

Whether or not the main power supply 16 is turned on is monitored during the time display operation (step S602). If the main power supply 16 is turned on by any cause, an interrupt is started (step S603). First, the time displayed on the pictograph LCD 25 is corrected (step S604). In this time correction, the CPU 2 accesses the real time clock (RTC) 61 to read out an accurate time, and supplies the time information to the microcomputer 17 via the serial interface sI/O. The microcomputer 17 performs time correction control for correcting the time displayed on the pictograph LCD 25 on the basis of the time information, and stores the time information in its internal RAM.

The time read out from the real time clock 61 is displayed on the pictograph LCD 25 (step S605).

During the display operation of the time read out from the real time clock 61, whether or not the operation of the main power supply 61 is stopped is monitored (step S606). If the operation of the main power supply 16 is stopped, the interrupt ends, and the time measured by the clock timer means of the microcomputer 17 is displayed on the pictograph LCD 25 again.

With the above-mentioned control, since the time which is measured by the clock timer means of the microcomputer 17 and is displayed in the stand-by state is corrected on the basis of the accurate time read out from the real time clock 61 when the apparatus shifts from the stand-by state to the operating state, a very accurate time can be displayed.

Since the CPU 2 accesses the real time clock, data exchange between the CPU 2 and the microcomputer 17 can be facilitated, and the scale of a system constituted by the microcomputer 17 can be reduced, thus easily achieving cost reduction.

Furthermore, since the RAM of the microcomputer 17 stores the accurate time, a very accurate time can be displayed when the apparatus shifts from the operating state to the stand-by state.

(Fourth Embodiment)

In the fourth embodiment, only portions different from the first embodiment will be explained, and a description of the same portions will be omitted by denoting the same parts by the same reference numerals.

Figure 14:
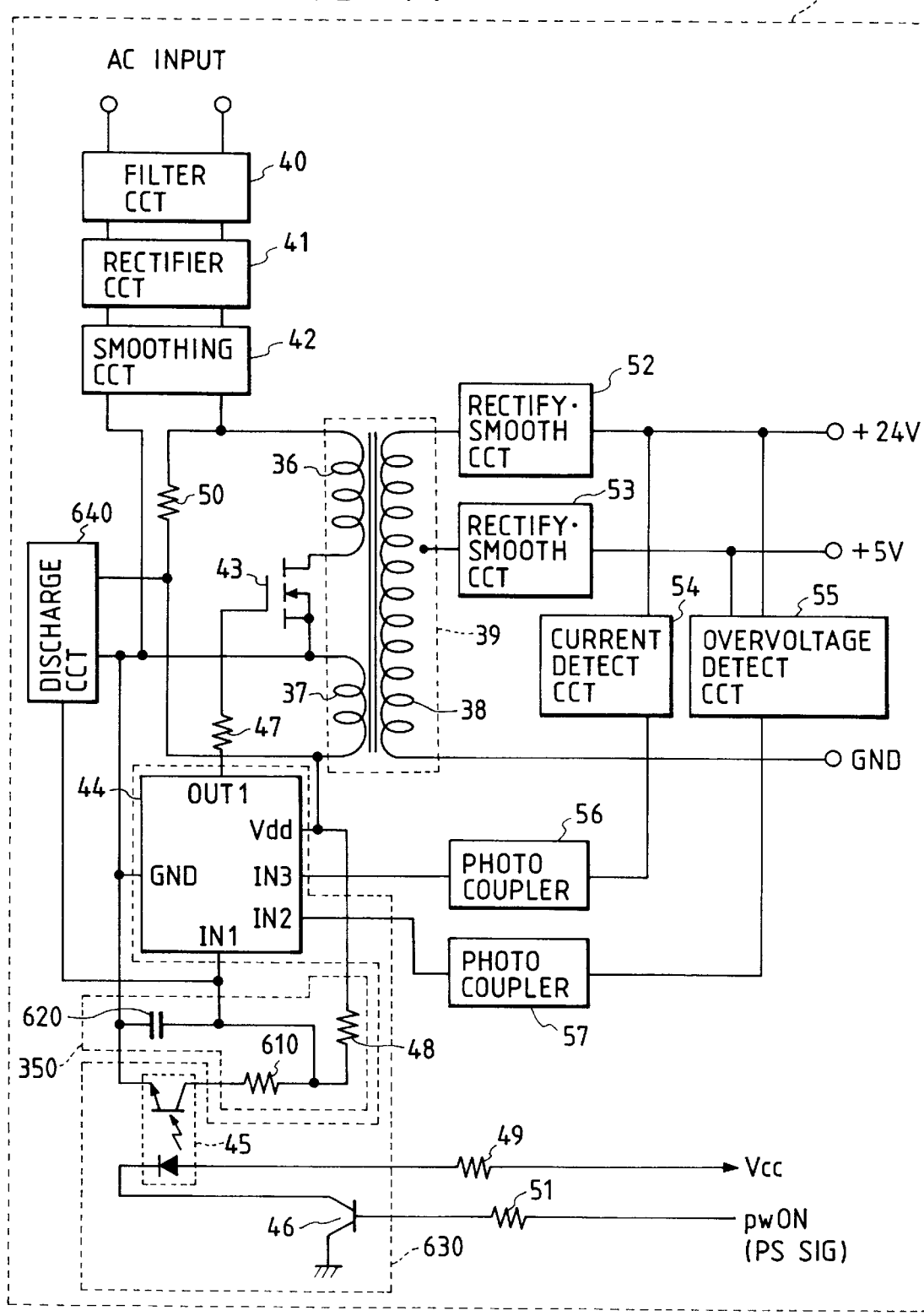
FIG. 14 is a schematic circuit diagram of a power supply device according to the fourth embodiment of the present invention.

FIG. 14 is a schematic circuit diagram of the main power supply 16 of the fourth embodiment.

A delay circuit 350 has a time constant defined by resistors 48 and 610, and a capacitor 620, and can set the time constant by changing the resistances of the resistors 48 and 610 and the electrical capacitance of the capacitor 620.

Owing to this delay circuit, a power can be supplied to the secondary side during a very short period of time (about 500 ms in this embodiment) at the beginning of an AC input (see the operation flow to be described later).

A switching control unit 630 is constituted by the IC 44 and the photo couplers 45 and 46, and ON/OFF-controls the FET 43 in response to a signal from the main power supply control unit 15.

A discharge circuit 640 immediately discharges a charge accumulated on the capacitor 620 when an AC input is shut off.

In order to immediately discharge the capacitor 620, the discharge circuit 640 is constituted by utilizing a high-speed switch element such as a transistor.

As described above, in order to supply a power to the secondary side for about 500 ms at the beginning of an AC input, the capacitor 620 must have a large capacitance.

However, when the capacitor 620 comprises a large-capacitance one, a very long period of time is required until the capacitor 620 is completely discharged when an AC input is shut off. For example, when the AC input is instantaneously shut off for a very short period of time, if the AC input is recovered before the capacitor 620 is completely discharged, the time constant cannot be assured, and it is often difficult to supply a power to the secondary side for about 500 ms.

Since the discharge circuit 640 is arranged, even when an AC input is instantaneously shut off, a charge accumulated on the capacitor 620 is immediately discharged, and when the AC input is recovered, a power can be reliably supplied to the secondary side for about 500 ms.

Note that the time period of about 500 ms is sufficiently longer than a time required from when the microcomputer 17 (see FIG. 2) is initialized until the PS signal changes to High level when an AC input is supplied.

Figure 15:
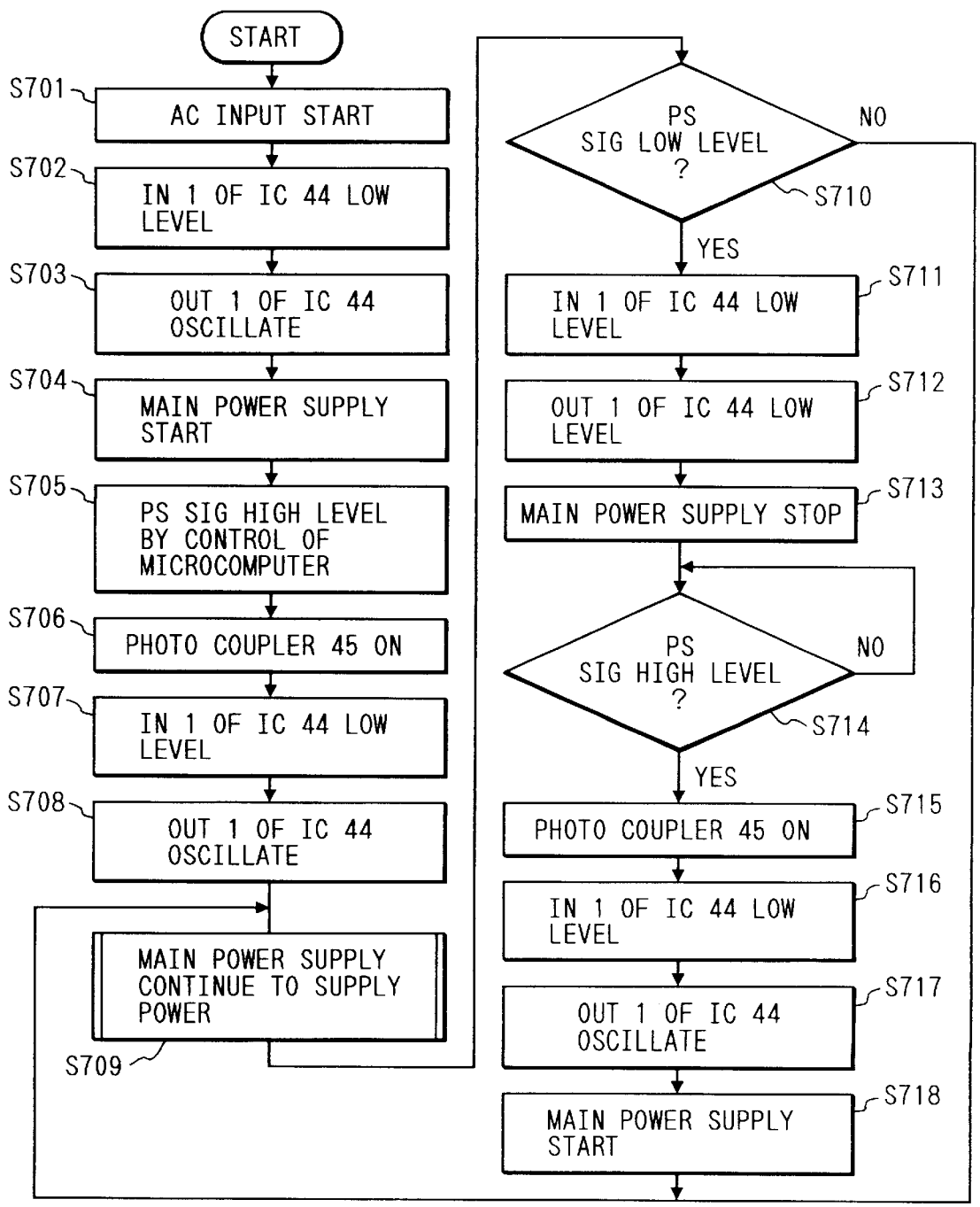
FIG. 15 is a flow chart showing the operation of the power supply device of the fourth embodiment.

FIG. 15 is a flow chart showing the operation of the main power supply 16 when an AC input is supplied.

When an AC input is started (step S701), since the port IN1 of the IC 44 is maintained at Low level for a predetermined period of time by the delay circuit 350 (step S702), the port OUT1 of the IC 44 oscillates accordingly (step S703), and the primary side oscillates via the FET 43 to supply a power to the secondary side, thus turning on the main power supply 16 (step S704).

When power supply to the secondary side begins, the port OUT5 of the microcomputer 17 outputs a High-level signal, and supplies it as the PS signal to the main power supply 16 (step S705).

In response to the PS signal, the transistor 46 is enabled, and a current is supplied to the photo coupler 45 to turn it on (step S706). Then, the port IN1 of the IC 44 changes to Low level (step S707). The port OUT1 of the IC 44 oscillates accordingly (step S708), and the primary side oscillates via the FET 43, thus supplying a power to the secondary side (step S709).

This state is maintained, and the main power supply 16 continuously supplies a power. The time constant of the delay circuit 350 is set so that the port IN1 is kept at Low level from when the AC input is started until the photo coupler 45 is turned on by the PS signal from the microcomputer 17.

When the PS signal changes to Low level (step S710), the transistor 46 is disabled, and the photo coupler 45 is also turned off. For this reason, the port IN1 of the IC 44 changes to High level (step S711), and the IC 44 sets its port OUT1 at Low level (step S712). As a result, the FET 43 is disabled, the primary side stops oscillation to stop power supply to the secondary side, and the main power supply 16 stops its operation (step S713).

When the PS signal changes to High level in this state (step S714), the transistor 46 is enabled, and the photo coupler 45 is turned on (step S715). The port IN1 of the IC 44 changes to Low level (step S716).

In response to the Low-level signal, the port OUT1 of the IC 44 oscillates (step S717), and the primary side oscillates via the FET 43, thus turning on the main power supply 16 (step S718).

This state is maintained, and the main power supply 16 continuously supplies a power.

Figure 16:
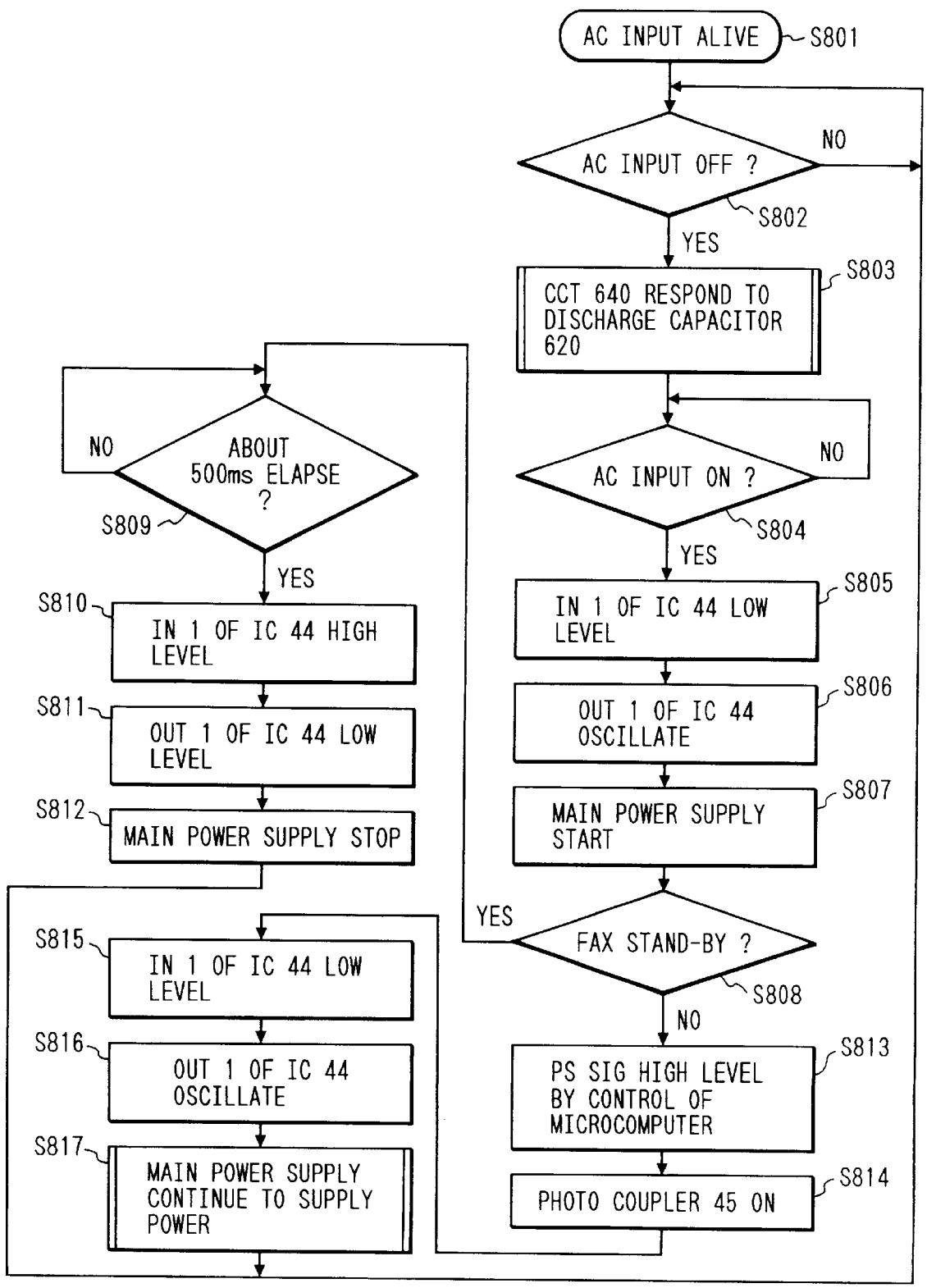
FIG. 16 is a flow chart showing an operation of a main power supply when an AC input is instantaneously shut off.

FIG. 16 is a flow chart showing the operation of the main power supply when an AC input is instantaneously shut off.

Referring to FIG. 16, when an AC input is shut off (S802) in a state wherein the AC input is present (step S801), the discharge circuit 640 operates to immediately discharge a charge accumulated on the capacitor 620 (step S803).

When the AC input is recovered (step S804), the port IN1 of the IC 44 changes to Low level (step S805), and the port OUT1 of the IC 44 oscillates accordingly (step S806). Then, the primary side of the isolating transformer 39 oscillates via the FET 43 to supply a power to the secondary side, thus turning on the main power supply 16 (step S807).

At this time, when the apparatus is in the FAX stand-by state (step S808), the port IN1 of the IC 44 changes to H level (step S810) after an elapse of about 500 ms (step S809), and the port OUT1 of the IC 44 changes to Low level (step S811). As a result, the main power supply 16 stops its operation (step S812).

After the AC input is recovered, the FAX stand-by state is maintained.

On the other hand, when the apparatus is not in the FAX stand-by state (step S808), the port OUT5 of the microcomputer 17 changes to High level, i.e., the PS signal changes to High level (step S813), the photo coupler 45 is turned on (step S814), and the port IN1 of the IC 44 changes to Low level (step S815). As a result, the port OUT1 of the IC 44 oscillates (step S816), and the primary side of the isolating transformer 39 oscillates via the FET 43, thus supplying a power to the secondary side.

With this control, even after the AC input is recovered, power supply from the main power supply 16 is maintained (step S817).

As described above, since the discharge circuit 640 is arranged, and operates when an AC input is shut off, even when the AC input is shut off for a very short period of time, the capacitor 620 is immediately discharged, and after the AC input is recovered, the main power supply 16 is reliably turned on for about 500 ms (the time defined by the time constant).

By utilizing the ON state of the main power supply 16 for about 500 ms, the ON/OFF state of the main power supply 16 can be desirably controlled.

As described above, since the discharge circuit is arranged, the following effects are expected.

(1) When a power supplied from a power supply source is shut off due to an instantaneous shut-off state, the discharge circuit operates to forcibly discharge a charge accumulated on the accumulation element (e.g., the capacitor) constituting the delay circuit.

(2) Since the discharge circuit is constituted using a high-speed switch element such as a transistor, even when a power supplied from a power supply source is shut off due to an instantaneous shut-off state, a charge accumulated on the accumulation element (e.g., the capacitor) constituting the delay circuit can be immediately discharged.

(3) From effects (1) and (2), even when a power is shut off for a very short period of time, the delay circuit reliably supplies a power to the secondary side for a predetermined period of time when the power supply from the power supply source is recovered.

(4) As described in effect (3), since the delay circuit reliably supplies a power to the secondary side for a predetermined period of time when the power supply from the power supply source is started such as upon recovery from an instantaneous shut-off state, there is no fear of an operation error of the system, and the main power supply can always be accurately controlled.

(5) The delay circuit can be realized with low cost since it can be constituted by only the resistors and the accumulation element (e.g., a capacitor).

(Fifth Embodiment)

Figure 17:
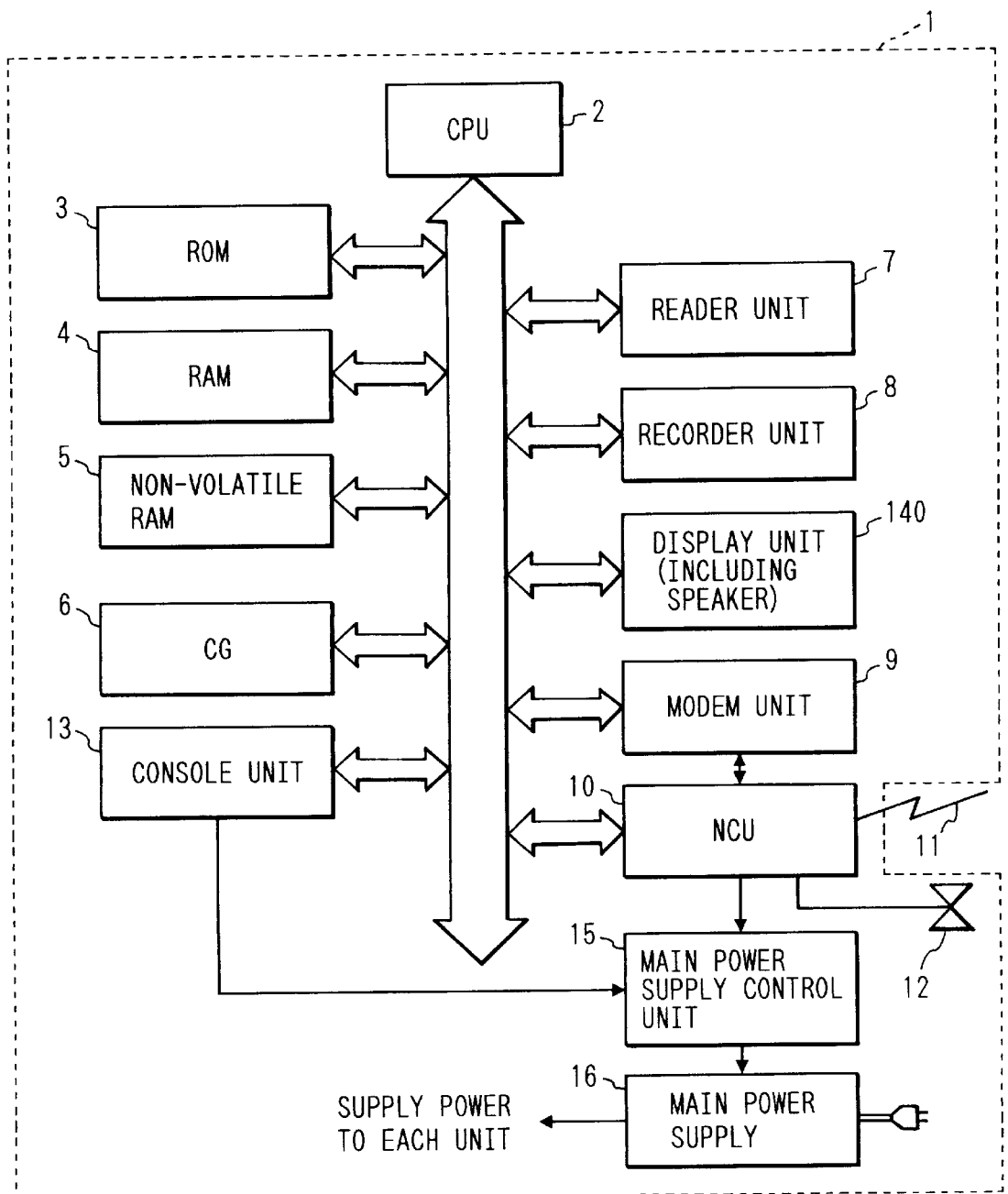
FIG. 17 is a block diagram showing the arrangement according to the fifth embodiment of the present invention.

Referring to FIG. 17, a display unit 140 of the fourth embodiment includes a speaker used for informing an ON operation of the main power supply to an operator.

The display unit 140 consists of an LCD module as a combination of a pictograph LCD for displaying the current time as 7-segment characters and various modes, and a dot-matrix LCD which can display sixteen 5×7 dot digits×1 row, LEDs, the speaker (not shown), and the like. The pictograph LCD and the dot-matrix LCD are independent from each other. The speaker is current-driven, and produces a line monitor sound, error sound, and the like.

Figure 18:
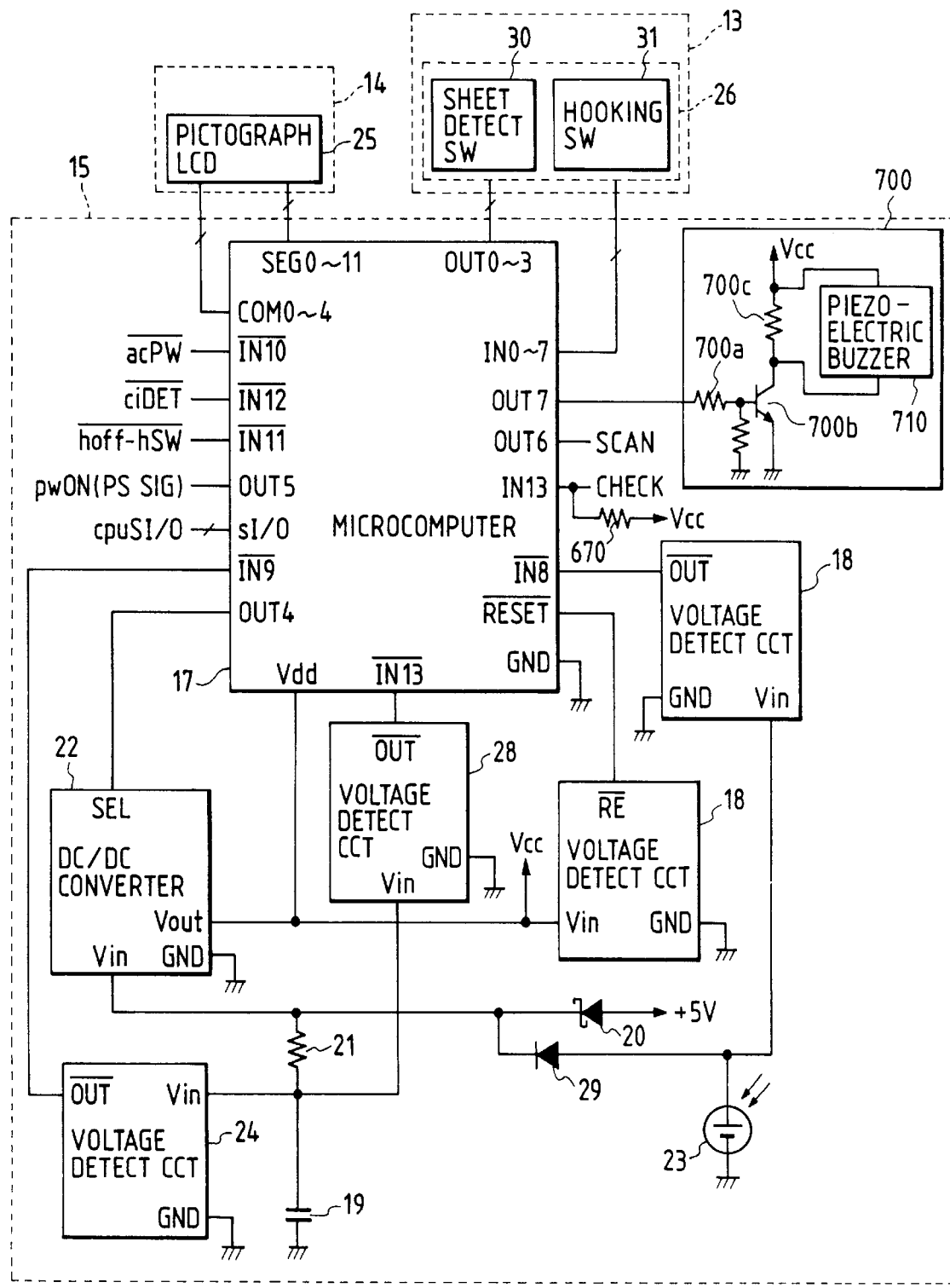
FIG. 18 is a schematic circuit diagram showing a main power supply control unit and its peripheral circuits of the fifth embodiment.

The schematic arrangement of the main power supply control unit 15 and its peripheral circuits according to the fifth embodiment will be described below with reference to FIG. 18.

A piezoelectric buzzer driving circuit 700 drives a power-saving type piezoelectric buzzer 710. The piezoelectric buzzer driving circuit 700 has a resistor 700a whose one terminal is connected to a port OUT7 of the microcomputer 17. The other terminal of the resistor 700a is connected to a transistor 700b. The operation of the transistor 700b is controlled by the microcomputer 17, and upon operation of the transistor 700b, a driving voltage is induced across the two terminals of a resistor 700c. This voltage is applied to the piezoelectric buzzer 710, and the piezoelectric buzzer 710 produces an information sound for informing the ON operation of the main power supply 16 (FIG. 1) to a user.

Figure 19:
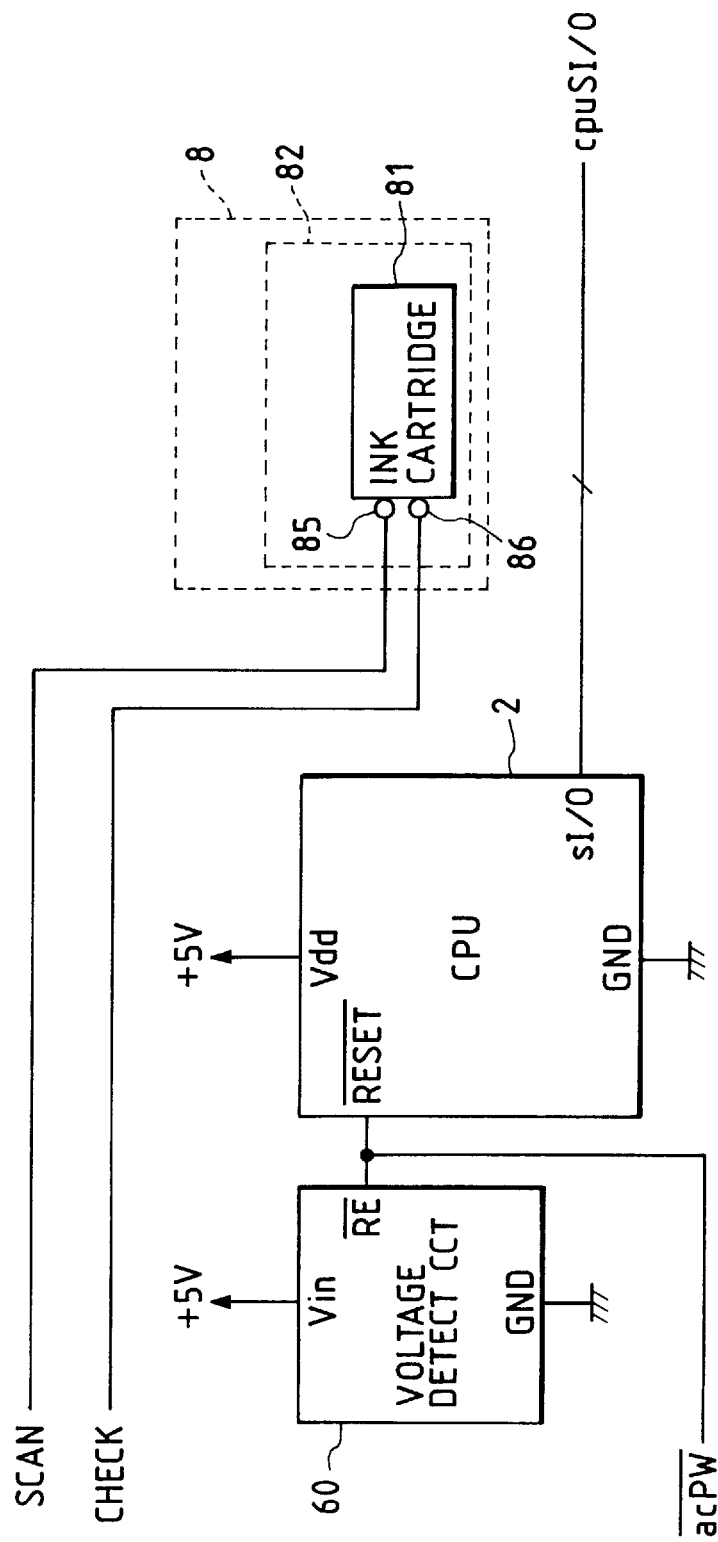
FIG. 19 is a diagram showing the circuit arrangement of a CPU and its peripheral circuits of the fifth embodiment.

The circuit arrangement of the CPU 2 and its peripheral circuits according to the fifth embodiment will be described below with reference to FIG. 19.

The ink-jet recording device of the recorder unit 8 has a carriage unit 82 for driving an ink cartridge 81. The ink cartridge 81 has a terminal 85 for receiving a signal SCAN for detecting the attachment/detachment of the cartridge, and a terminal 86 for outputting a signal CHECK. The signal SCAN is output from the port OUT6 of the microcomputer 17 (FIG. 18), and the signal CHECK is input to a port IN13 of the microcomputer 17.

In the fifth embodiment, when an interrupt is started in step S204 in FIG. 7, the transistor 700b is enabled by the microcomputer 17. Upon operation of the transistor 700b, a voltage induced across the two terminals of the resistor 700c is applied to the piezoelectric buzzer 710, thus driving the piezoelectric buzzer 710. When the piezoelectric buzzer 710 is driven, an information sound for informing insertion of a document sheet to a predetermined position is produced (step S204). After the information sound is produced, the processing in step S205 and subsequent steps is executed.

On the other hand, when an interrupt is started in step S304 or S316 in FIG. 8, the transistor 700b is enabled by the microcomputer 17. Upon operation of the transistor 700b, a voltage induced across the two terminals of the resistor 700c is applied to the piezoelectric buzzer 710, thus driving the piezoelectric buzzer 710. When the piezoelectric buzzer 710 is driven, an information sound for informing depression of the hooking button is produced (step S304 or S316). After the information sound is produced, the subsequent processing is executed.

When a CNG signal is not detected or a speech signal is detected after a CI signal is detected in step S303, the speaker of the display unit 140 is driven under the control of the CPU 2, and the speaker generates a pseudo ringing tone, thus performing a telephone operation.

With the above-mentioned control, when a document sheet is inserted in the FAX stand-by state or the hooking button is depressed, an interrupt is started after an information sound is produced from the piezoelectric buzzer 710. Therefore, the ON operation of the main power supply 16 can be informed to a user immediately before the main power supply 16 is turned on, and the user can be prevented from feeling poor response.

Since the piezoelectric buzzer 710 requires a low consumption power, the number of times of charging of the secondary battery 19 can be reduced.

During the operation of the main power supply 16, since the speaker produces a line monitor sound, and the like, various information sounds can be easily produced while preventing a user from feeling uneasy.

What is claimed is:

1. A power supply device for a communication apparatus, comprising:

a main power supply for receiving power from and AC source and supplying power to each unit of a communication apparatus main body;

main power supply control means for ON/OFF-controlling said main power supply;

a battery for supplying power to said main power supply control means; and constant voltage generation means for maintaining an output voltage from said battery constant, wherein, when said main power supply is ON, said main power supply control means receives power supplied from said main power supply, and when said main power supply is OFF, said main power supply control means receives power supplied from said battery via said constant voltage generation means.

2. A device according to claim 1, wherein said battery comprises a rechargeable battery.

3. A device according to claim 1, wherein said battery comprises a solar battery.

4. A device according to claim 2, wherein said main power supply charges said rechargeable battery when said main power supply is ON.

5. A device according to claim 1, wherein said battery comprises a rechargeable battery and a solar battery, and when said solar battery outputs power, said main power supply control means receives the power supplied from said solar battery, and when said solar battery does not output power, said main power supply control means receives power supplied from said secondary battery.

6. A device according to claim 5, wherein said solar battery charges said rechargeable battery.

7. A device according to claim 6, wherein when said main power supply is ON, said rechargeable battery is charged by said solar battery, and when said main power supply is OFF and said solar battery outputs power, said rechargeable battery is charged by said solar battery.

8. A device according to claim 1, wherein said main power supply control means turns on said main power supply in response to an input turn-on signal or to charge said rechargeable battery.

9. A device according to claim 8, further comprising main body control means, wherein the turn-on signal is input to said main body control means for controlling the communication apparatus main body.

10. A device according to claim 9, wherein the turn-on signal is a calling signal from a line, a key input signal of console means operated by an operator, a sheet detection signal, an input signal of a communication start key, or an off-hook signal of a handset.

11. A device according to claim 1, further comprising main body control means, wherein said main power supply control means turns off said main powers supply on the basis of a control signal from said main body control means for controlling the communication apparatus main body.

12. A device according to claim 11, wherein said battery comprises a rechargeable battery, and the control signal is output from said main body control means to said main power supply control means in response to end of charging of said rechargeable battery.

13. A device according to claim 12, wherein the end of charging of said rechargeable battery is detected when a measurement value of a timer for measuring a charging time reaches a predetermined value.

14. A device according to claim 1, wherein said main power supply comprises a switching power supply.

15. A device according to claim 2, wherein said main power supply control means comprises a timer, and turns on said main power supply to charge said rechargeable battery when a continuous OFF time of said main power supply reaches a predetermined time.

16. A power supply device for a communication apparatus, comprising:

a main power supply for receiving power from and AC source and supplying power to each unit of a communication apparatus main body;

main power supply control means for ON/OFF-controlling said main power supply;

a battery for supplying power to said main power supply control means; and constant voltage generation means for maintaining an output voltage from said battery constant, wherein, when said main power supply is ON, said main power supply control means receives power supplied from said main power supply, and when said main power supply is OFF, said main power supply control means receives power supplied from said battery via said constant voltage generation means, wherein said communication apparatus comprises an image communication apparatus.

17. A power supply device for a communication apparatus, comprising:

a main power supply for receiving power from and AC source and supplying power to each unit of a communication apparatus main body;

main power supply control means for ON/OFF-controlling said main power supply;

a battery for supplying power to said main power supply control means; and constant voltage generation means for maintaining an output voltage from said battery constant, wherein, when said main power supply is ON, said main power supply control means receives power supplied from said main power supply, and when said main power supply is OFF, said main power supply control means receives power supplied from said battery via said constant voltage generation means, wherein said communication apparatus comprises a facsimile apparatus.

18. A device according to claim 2, further comprising: voltage detection means for detecting a voltage output from said rechargeable battery, and wherein said main power supply control means turns on said main power supply in correspondence with a detection result of said voltage detection means.

19. A device according to claim 1, wherein said constant voltage generation means comprises a booster type switching regulator.

20. A power supply device for a communication apparatus, comprising:

a main power supply for supplying power to each unit of a communication apparatus main body;

main power supply control means for ON/OFF-controlling said main power supply;

a battery for supplying power to said main power supply control means;

reading means for reading a document sheet; and sheet detection means for detecting presence/absence of a document sheet, wherein said main power supply control means receives power supplied from said main power supply when said main power supply is ON, said main power supply control means receives power supplied from said battery when said main power supply is OFF, said sheet detection means intermittently performs detection of a document sheet when said main power supply is OFF, and said main power supply control means turns on said main power supply in correspondence with a detection result provided by said sheet detection means.

21. A device according to claim 20, wherein said battery comprises a rechargeable battery.

22. A device according to claim 20, wherein said battery comprises a solar battery.

23. A device according to claim 22, wherein said main power supply charges said rechargeable battery when said main power supply is ON.

24. A device according to claim 20, wherein said sheet detection means continuously performs sheet detection when said main power supply is ON.

25. A device according to claim 20, wherein said battery comprises a rechargeable battery and a solar battery, and
when said solar battery outputs power, said main power supply control means receives the power supplied from said solar battery, and when said solar battery does not output power, said main power supply control means receives power supplied from said rechargeable battery.

26. A device according to claim 25, wherein said solar battery charges said rechargeable battery.

27. A device according to claim 26, wherein, when said main power supply is ON, said rechargeable battery is charged by said solar battery, and when said main power supply is OFF and said solar battery outputs power, said rechargeable battery is charged by said solar battery.

28. A device according to claim 20, wherein said main power supply control means turns on said main power supply in response to an input turn-on signal or to charge said rechargeable battery.

29. A device according to claim 28, further comprising main body control means, wherein the turn-on signal is input to said main body control means for controlling the communication apparatus main body.

30. A device according to claim 29, wherein the turn-on signal is a calling signal from a line, a key input signal of console means operated by an operator, a sheet detection signal, an input signal of a communication start key, or an off-hook signal of a handset.

31. A device according to claim 20, further comprising main body control means, wherein said main power supply control means turns off said main power supply on the basis of a control signal from said main body control means for controlling the communication apparatus main body.

32. A device according to claim 31, wherein said battery comprises a rechargeable battery,
and the control signal is output from said main body control means to said main power supply control means in response to end of charging of said rechargeable battery.

33. A device according to claim 32, wherein the end of charging of said rechargeable battery is detected when a measurement value of a timer for measuring a charging time reaches a predetermined value.

34. A device according to claim 20, wherein said main power supply comprises a switching power supply.

35. A device according to claim 21, wherein said main power supply control means comprises a timer, and turns on said main power supply to charge said rechargeable battery when a continuous OFF time of said main power supply reaches a predetermined time.

36. A power supply device for a communication apparatus, comprising:
a main power supply for supplying power to each unit of a communication apparatus main body;
main power supply control means for ON/OFF-controlling said main power supply;
a battery for supplying power to said main power supply control means;
reading means for reading a document sheet; and
sheet detection means for detecting presence/absence of a document sheet,
wherein said main power supply control means receives power supplied from said main power supply when said main power supply is ON, said main power supply control means receives power supplied from said battery when said main power supply is OFF, said sheet detection means intermittently performs detection of a document sheet when said main power supply is OFF, and said main power supply control means turns on said main power supply in correspondence with a detection result provided by said sheet detection means, wherein said communication apparatus comprises an image communication apparatus.

37. A power supply device for a communication apparatus, comprising:
a main power supply for supplying power to each unit of a communication apparatus main body;
main power supply control means for ON/OFF-controlling said main power supply;
a battery for supplying power to said main power supply control means;
reading means for reading a document sheet; and
sheet detection means for detecting presence/absence of a document sheet,
wherein said main power supply control means receives power supplied from said main power supply when said main power supply is ON, said main power supply control means receives power supplied from said battery when said main power supply is OFF, said sheet detection means intermittently performs detection of a document sheet when said main power supply is OFF, and said main power supply control means turns on said main power supply in correspondence with a detection result provided by said sheet detection means, wherein said communication apparatus comprises a facsimile apparatus.

38. A device according to claim 21, further comprising: voltage detection means for detecting a voltage output from said rechargeable battery, and wherein said main power supply control means turns on said main power supply in correspondence with a detection result provided by said voltage detection means.

39. A power supply device for a communication apparatus, comprising:
a main power supply for supplying power to each unit of a communication apparatus main body;
main power supply means, having a timer, for ON/OFF-controlling said main power supply;
a battery for supplying power to said main power supply control means;
clock means for measuring time; and display means for displaying the time,
wherein said main power supply control means receives power supplied from said main power supply when said main power supply is ON, said main power supply control means receives power supplied from said battery when said main power supply is OFF, said display means displays the time measured by said clock means when said main power supply is ON, and said display means displays the time measured by said timer of said main power supply control means when said main power supply is OFF.

40. A device according to claim 39, wherein said battery comprises a rechargeable battery.

41. A device according to claim 39, wherein said battery comprises a solar battery.

42. A device according to claim 40, wherein said main power supply charges said rechargeable battery when said main power supply is ON.

43. A device according to claim 39, wherein said battery comprises a rechargeable battery and a solar battery, and when said solar battery outputs power, said main power supply control means receives the power supplied from said solar battery, and when said solar battery does not output power, said main power supply control means receives power supplied from said rechargeable battery.

44. A device according to claim 43, wherein said solar battery charges said rechargeable battery.

45. A device according to claim 44, wherein, when said main power supply is ON, said rechargeable battery is charged by said solar battery, and when said main power supply is OFF and said solar battery outputs power, said rechargeable battery is charged by said solar battery.

46. A device according to claim 39, wherein said main power supply control means turns on said main power supply in response to an input turn-on signal or to charge said rechargeable battery.

47. A device according to claim 46, further comprising main body control means, wherein the turn-on signal is input to said main body control means for controlling the communication apparatus main body.

48. A device according to claim 47, wherein the turn-on signal is a calling signal from a line, a key input signal of console means operated by an operator, a sheet detection signal, an input signal of a communication start key, or an off-hook signal of a handset.

49. A device according to claim 39, further comprising main body control means, wherein said main power supply control means turns off said main power supply on the basis of a control signal from said main body control means for controlling the communication apparatus main body.

50. A device according to claim 49, wherein said battery comprises a rechargeable battery, and the control signal is output from said main body control means to said main power supply control means in response to end of charging of said rechargeable battery.

51. A device according to claim 50, wherein the end of charging of said rechargeable battery is detected when a measurement value of a timer for measuring a charging time reaches a predetermined value.

52. A device according to claim 39, wherein said main power supply comprises a switching power supply.

53. A device according to claim 40, wherein said main power supply control means comprises said timer, and turns on said main power supply to charge said rechargeable battery when a continuous OFF time of said main power supply reaches a predetermined time.

54. A power supply device for a communication apparatus, comprising:

a main power supply for supplying power to each unit of a communication apparatus main body;

main power supply means, having a timer, for ON/OFF-controlling said main power supply;

a battery for supplying power to said main power supply control means;

clock means for measuring time; and display means for displaying the time, wherein said main power supply control means receives power supplied from said main power supply when said main power supply is ON, said main power supply control means receives power supplied from said battery when said main power supply is OFF, said display means displays the time measured by said clock means when said main power supply is ON, and said display means displays the time measured by said timer of said main power supply control means when said main power supply is OFF, wherein said communication apparatus comprises an image communication apparatus.

55. A power supply device for a communication apparatus, comprising:

a main power supply for supplying power to each unit of a communication apparatus main body;

main power supply means, having a timer, for ON/OFF-controlling said main power supply;

a battery for supplying power to said main power supply control means;

clock means for measuring time; and display means for displaying the time, wherein said main power supply control means receives power supplied from said main power supply when said main power supply is ON, said main power supply control means receives power supplied from said battery when said main power supply is OFF, said display means displays the time measured by said clock means when said main power supply is ON, and said display means displays the time measured by said timer of said main power supply control means when said main power supply is OFF, wherein said communication apparatus comprises a facsimile apparatus.

56. A power supply device comprising:

a main power supply for supplying power to each unit of an apparatus main body upon reception of an input power;

main power supply control means for ON/OFF-controlling said main power supply;

power detection means for detecting presence/absence of power supplied to said main power supply;

state holding means for, when the power input to said main power supply changes from an absence state to a presence state, turning on said main power supply for a predetermined period of time required for initializing said main power supply control means so as to supply power to said main power supply control means; and reset means for resetting said state holding means when said power detecting means detects that the power changes from a presence state to an absence state.

57. A device according to claim 56, further comprising: a battery for supplying a power to said main power supply control means.

58. A device according to claim 57, wherein said battery comprises a rechargeable battery.

59. A device according to claim 57, wherein said battery comprises a solar battery.

60. A device according to claim 58, wherein said rechargeable battery is charged by said main power supply.

61. A device according to claim 56, wherein said power supply device is a power supply device for a communication apparatus.

62. A device according to claim 61, wherein said communication apparatus comprises an image communication apparatus.

63. A device according to claim 62, wherein said communication apparatus comprises a facsimile apparatus.

64. A power supply device for a communication apparatus, comprising:

a main power supply for supplying power to each unit of a communication apparatus main body;

main power supply control means for ON/OFF-controlling said main power supply;

a battery for supplying power to said main power supply control means;

console means operated by an operator; and producing means for producing a confirmation sound in response to an operation of said console means, wherein said main power supply control means detects whether or not said console means is operated, and controls said producing means to generate the confirmation sound in correspondence a detection result, and said main power supply control means receives power supplied from said main power supply when said main power supply is ON, and said main power supply control means receives a power supplied from said battery when said main power supply is OFF.

65. A device according to claim 64, wherein said battery comprises a rechargeable battery.

66. A device according to claim 64, wherein said battery comprises a solar battery.

67. A device according to claim 65, wherein said main power supply charges said rechargeable battery when said main power supply is ON.

68. A device according to claim 64, wherein said battery comprises a rechargeable battery and a solar battery, and when said solar battery outputs power, said main power supply control means receives the power supplied from said solar battery, and when said solar battery does not output power, said main power supply control means receives power supplied from said rechargeable battery.

69. A device according to claim 68, wherein said solar battery charges said rechargeable battery.

70. A device according to claim 69, wherein when said main power supply is ON, said rechargeable battery is charged by said solar battery, and when said main power supply is OFF and said solar battery outputs power, said rechargeable battery is charged by said solar battery.

71. A device according to claim 64, wherein said main power supply control means turns on said main power supply in response to an input turn-on signal or to charge said rechargeable battery.

72. A device according to claim 71, further comprising main body control means, wherein the turn-on signal is input to said main body control means for controlling the communication apparatus main body.

73. A device according to claim 72, wherein the turn-on signal is a calling signal from a line, a key input signal of said console means operated by the operator, a sheet detection signal, an input signal of a communication start key, or an off-hook signal of a handset.

74. A device according to claim 64, further comprising main body control means, wherein said main power supply control means turns off said main power supply on the basis of a control signal from said main body control means for controlling the communication apparatus main body.

75. A device according to claim 74, wherein said battery comprises a rechargeable battery, and the control signal is output from said main body control means to said main power supply control means in response to end of charging of said secondary battery.

76. A device according to claim 75, wherein the end of charging of said rechargeable battery is detected when a measurement value of a timer for measuring a charging time reaches a predetermined value.

77. A device according to claim 64, wherein said main power supply comprises a switching power supply.

78. A device according to claim 65, wherein said main power supply control means comprises a timer, and turns on said main power supply to charge said rechargeable battery when a continuous OFF time of said main power supply reaches a predetermined time.

79. A power supply device for a communication apparatus, comprising:

a main power supply for supplying power to each unit of a communication apparatus main body;

main power supply control means for ON/OFF-controlling said main power supply;

a battery for supplying power to said main power supply control means;

console means operated by an operator; and producing means for producing a confirmation sound in response to an operation of said console means, wherein said main power supply control means detects whether or not said console means is operated, and controls said producing means to generate the confirmation sound in correspondence a detection result, and said main power supply control means receives power supplied from said main power supply when said main power supply is ON, and said main power supply control means receives a power supplied from said battery when said main power supply is OFF, wherein said communication apparatus comprises an image communication apparatus.

80. A power supply device for a communication apparatus, comprising:

a main power supply for supplying power to each unit of a communication apparatus main body;

main power supply control means for ON/OFF-controlling said main power supply;

a battery for supplying power to said main power supply control means;

console means operated by an operator; and producing means for producing a confirmation sound in response to an operation of said console means, wherein said main power supply control means detects whether or not said console means is operated, and controls said producing means to generate the confirmation sound in correspondence a detection result, and said main power supply control means receives power supplied from said main power supply when said main power supply is ON, and said main power supply control means receives a power supplied from said battery when said main power supply is OFF, wherein said communication apparatus comprises a facsimile apparatus.

81. A power supply device comprising:

a power supply for converting AC power to DC power and outputting the DC power;

a processor operable by the DC power output from said power supply, said processor being initialized when the DC power is supplied thereto; and a device for starting re-initialization of said processor in response to an occurrence of an instantaneous turning off of the AC power, the re-initialization starting after the AC power has been restored.

82. A device according to claim 81, wherein said power supply device is a power supply device of a communication apparatus.

83. An original document reading apparatus, comprising:
- a reading unit for reading an original sheet;
- a sensor for detecting the presence and absence of the original sheet; and
- a processor for enabling and disabling said sensor to detect the presence and absence of the document sheet in a standby mode, and, in reply to a detection of the presence of the document sheet by said sensor, changing the standby mode into an operation mode and causing said sensor to effect continuous detection of the presence and absence of the document sheet.

84. A reading apparatus according to claim 83, wherein said reading apparatus is a reading apparatus of a communication apparatus.

* * * * *

UNITED STATES PATENT AND TRADEMARK OFFICE
CERTIFICATE OF CORRECTION

PATENT NO. : 5,834,857
DATED     : November 10, 1998
INVENTOR(S): KOICHI ABE ET AL.

Page 1 of 2

It is certified that error appears in the above-identified patent and that said Letters Patent is hereby corrected as shown below:

In the Drawings:

SHEET 9

Figure 9, "BATERY ?" should read --BATTERY?--.

COLUMN 6

Line 23, "starts/stop" should read --starts/stops--.

COLUMN 14

Line 24, "convey" should read --conveyance--.

COLUMN 18

Line 60, "and" should read --an--.

COLUMN 19

Line 43, "powers" should read --power--.
Line 65, "and" should read --an--.

COLUMN 20

Line 17, "and" should read --an--.

UNITED STATES PATENT AND TRADEMARK OFFICE
CERTIFICATE OF CORRECTION

PATENT NO. : 5,834,857
DATED      : November 10, 1998
INVENTOR(S): KOICHI ABE ET AL.

It is certified that error appears in the above-identified patent and that said Letters Patent is hereby corrected as shown below:

COLUMN 21

Line 26, "rechargeable" should be deleted.

COLUMN 23

Line 23, "rechargeable" should be deleted.

COLUMN 25

Line 15, "a" should read --to a--.
    Line 45, "rechargeable" should be deleted.
    Line 65, "secondary" should read --rechargeable--.

COLUMN 26

Line 24, "a" should read --to a--.
    Line 46, "a" should read --to a--.

Signed and Sealed this

Seventeenth Day of August, 1999

Attest:

Q. TODD DICKINSON

Attesting Officer      Acting Commissioner of Patents and Trademarks